US012757153B2

(12) United States Patent
Hao

(10) Patent No.: US 12,757,153 B2
(45) Date of Patent: Oct. 6, 2026

(54) COMMUNICATION METHOD AND RELATED APPARATUS

(71) Applicant: Huawei Technologies Co., Ltd., Shenzhen (CN)

(72) Inventor: Jinping Hao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 228 days.

(21) Appl. No.: 18/647,684

(22) Filed: Apr. 26, 2024

(65) Prior Publication Data

US 2024/0276436 A1 Aug. 15, 2024

Related U.S. Application Data

(63) Continuation of application No. PCT/CN2022/126562, filed on Oct. 21, 2022.

(30) Foreign Application Priority Data

Oct. 29, 2021 (CN) ......................... 202111279991.8

(51) Int. Cl.
*H04W 64/00* (2009.01)

(52) U.S. Cl.
CPC .................................. *H04W 64/00* (2013.01)

(58) Field of Classification Search
CPC ........ H04L 5/00; H04L 5/0048; H04W 24/08; H04W 24/10; H04W 64/00; H04W 88/085
See application file for complete search history.

(56) References Cited

U.S. PATENT DOCUMENTS

2020/0128506 A1* 4/2020 Zhang .................... H04W 64/00
2021/0297216 A1* 9/2021 Shreevastav .......... H04L 5/0048
(Continued)

FOREIGN PATENT DOCUMENTS

CN 111586742 A 8/2020
WO 2020092714 A1 5/2020
(Continued)

OTHER PUBLICATIONS

3GPP TS 38.455 V16.5.0 (Oct. 2021), 3rd Generation Partnership Project; Technical Specification Group Radio Access Network; NG-RAN; NR Positioning Protocol A (NRPPa) (Release 16), total 152 pages.
(Continued)

*Primary Examiner* — Babar Sarwar
(74) *Attorney, Agent, or Firm* — Slater Matsil, LLP

(57) ABSTRACT

Embodiments of this application disclose a communication method, including: A location management device sends time information to a first access network device, where the time information indicates to measure, after a reference time indicated by the time information, an $X^{th}$ sounding reference signal SRS sent by a terminal device, and X is an integer greater than or equal to 1. The location management device sends the time information to a second access network device. The location management device receives a first measurement result from the first access network device, where the first measurement result is obtained by measuring an SRS of the terminal device based on the time information. The location management device receives a second measurement result from the second access network device, where the second measurement result is obtained by measuring the SRS of the terminal device based on the time information.

20 Claims, 7 Drawing Sheets

(56) References Cited

U.S. PATENT DOCUMENTS

| | | | | |
|---|---|---|---|---|
| 2022/0110085 | A1* | 4/2022 | Khoryaev | H04W 74/0833 |
| 2022/0236366 | A1* | 7/2022 | Cha | H04W 72/0453 |
| 2022/0368496 | A1* | 11/2022 | Shreevastav | H04W 64/00 |
| 2022/0394659 | A1* | 12/2022 | Vassilovski | H04W 4/40 |
| 2023/0133369 | A1* | 5/2023 | Matsumura | H04L 5/0055 370/329 |
| 2023/0198710 | A1* | 6/2023 | Dong | H04L 5/0094 370/329 |
| 2023/0296752 | A1* | 9/2023 | Thomas | G01S 5/0072 342/125 |

FOREIGN PATENT DOCUMENTS

| | | | | |
|---|---|---|---|---|
| WO | 2020164334 | A1 | 8/2020 | |
| WO | WO-2021091472 | A1 * | 5/2021 | H04L 5/0051 |
| WO | WO-2022045798 | A1 * | 3/2022 | H04L 5/0048 |

OTHER PUBLICATIONS

3GPP TS 38.473 V16.7.0 (Oct. 2021), 3rd Generation Partnership Project; Technical Specification Group Radio Access Network; NG-RAN; F1 application protocol (F1AP) (Release 16), total 464 pages.

5G; NG-RAN; NR Positioning Protocol A (NRPPa) (3GPP TS 38.455 version 16.3.0 Release 16), ETSI TS 138 455 V16.3.0 (Apr. 2021), total 151 pages.

5G; NG Radio Access Network (NG-RAN); Stage 2 functional specification of User Equipment (UE) positioning in NG-RAN (3GPP TS 38.305 version 16.5.0 Release 16), ETSI TS 138 305 V16.5.0 (Sep. 2021), total 122 pages.

* cited by examiner

COMMUNICATION METHOD AND RELATED APPARATUS

CROSS-REFERENCE TO RELATED APPLICATIONS

This application is a continuation of International Application No. PCT/CN2022/126562, filed on Oct. 21, 2022, which claims priority to Chinese Patent Application No. 202111279991.8, filed on Oct. 29, 2021. The disclosures of the aforementioned applications are herein incorporated by reference in their entireties.

TECHNICAL FIELD

This application relates to communication technologies, and in particular, to a communication method and a related apparatus.

BACKGROUND

A positioning function is an important function of 5G new radio (NR). Currently, in an uplink positioning technology, a location management function (LMF) device sends a measurement request to at least two base stations, to request to measure a sounding reference signal (SRS) sent by a terminal device. After receiving the measurement request, the at least two base stations may measure the SRS sent by the terminal device to obtain measurement results, and report the measurement results to the LMF device. The LMF device may calculate a location of the terminal device based on the measurement results reported by the at least two base stations.

For the solution in which the LMF device determines the location of the terminal device based on the measurement results of the at least two base stations, how to improve accuracy of determining the location of the terminal device by the LMF device, to improve positioning precision is a problem to be considered.

SUMMARY

Embodiments of this application provide a communication method and a related apparatus, to improve positioning precision of positioning a terminal device by a location management device.

A first aspect of this application provides a communication method, includes a location management device sends time information to a first access network device, where the time information indicates to measure, after a reference time indicated by the time information, an $X^{th}$ SRS sent by a terminal device, and X is an integer greater than or equal to 1. The location management device sends the time information to a second access network device. The location management device receives a first measurement result from the first access network device, where the first measurement result is obtained by measuring an SRS of the terminal device based on the time information. The location management device receives a second measurement result from the second access network device, where the second measurement result is obtained by measuring the SRS of the terminal device based on the time information.

In the foregoing technical solution, the location management device sends the time information to the first access network device and the second access network device, to indicate to measure, after the reference time indicated by the time information, the $X^{th}$ SRS sent by the terminal device. The location management device may receive the first measurement result and the second measurement result. The first measurement result is obtained by measuring the SRS of the terminal device based on the time information, and the second measurement result is obtained by measuring the SRS of the terminal device based on the time information. This helps improve positioning precision of positioning the terminal device by the location management device. For example, the location management device may determine a location of the terminal device based on the first measurement result and the second measurement result. Because the first measurement result and the second measurement result are obtained by measuring the SRS sent by the terminal device at a same moment, accuracy of determining the location of the terminal device by the location management device is improved, and positioning precision is improved. Further, when X is equal to 1, the time information indicates to measure, after the reference time indicated by the time information, a $1^{st}$ SRS sent by the terminal device. The access network device that receives the time information may measure the $1^{st}$ SRS sent by the terminal device after the reference time, to reduce a measurement delay, and improve positioning efficiency.

In a possible implementation, the time information includes at least one of the following: a coordinated universal time (UTC), a relative time 1900, a system frame number, or a slot number.

In the foregoing implementation, the location management device may indicate, by using an absolute time (for example, the UTC or the relative time 1900), a reference time for measuring the SRS. Alternatively, the location management device indicates, by using the system frame number and the slot number, a reference time for measuring the SRS. In this way, the first access network device and the second access network device measure the SRS of the terminal device based on the reference time indicated by the time information, to improve positioning precision of the terminal device.

In another possible implementation, the time information further indicates to measure, after the reference time indicated by the time information plus an integer multiple of a measurement periodicity, the $X^{th}$ SRS sent by the terminal device.

The foregoing implementation is applicable to a scenario of periodically measuring an SRS. The location management device may indicate, by using the time information, the first access network device and the second access network device to measure, after a reference time indicated by the time information plus the integer multiple of the measurement periodicity, the $X^{th}$ SRS sent by the terminal device. In this way, the first access network device and the second access network device measure, in each measurement periodicity, an SRS sent by the terminal device at a same moment. In this way, positioning precision of positioning calculation performed on the terminal device by the location management device is improved.

In another possible implementation, the time information is carried in a measurement reference time information element, or carried in a reference time information element, or carried in a measurement time information element.

The foregoing implementation shows an information element carrying the time information, which helps the first access network device and the second access network device parse the time information. In other words, the first access network device and the second access network device may obtain corresponding time information by parsing content of the information element. In this way, the first access network device and the second access network device measure the SRS of the terminal device based on the reference time indicated by the time information, to improve positioning precision of the terminal device.

In another possible implementation, the time information received by the first access network device is carried in a first request message, and the first measurement result is carried in a first response message. The time information received by the second access network device is carried in a second request message, and the second measurement result is carried in a second response message.

In the foregoing implementation, the location management device may interact with the first access network device and the second access network device via a request message and a response message, so that the location management device delivers the time information and collects measurement results obtained by measuring, by different access network devices, the SRS sent by the terminal device based on the time information indicated by the location management device. In this way, the location management device determines the location of the terminal device based on measurement results of a plurality of access network devices, thereby accurately positioning the terminal device.

In another possible implementation, the first request message includes a measurement request message, the first response message includes a measurement response message, the second request message includes a measurement request message, and the second response message includes a measurement response message.

The foregoing implementation shows specific forms of the request message and the response message. In other words, the location management device may deliver the time information and collect the measurement result via an existing message. Therefore, there is no need to define a new message, thereby improving adaptability of the solution to a current communication system, and improving practicability of the solution.

In another possible implementation, the method further includes: The location management device determines the location of the terminal device based on the first measurement result and the second measurement result.

It can be learned from the foregoing implementation that the first measurement result is obtained by measuring the SRS of the terminal device based on the time information indicated by the location management device, and the second measurement result is obtained by measuring the SRS of the terminal device based on the time information indicated by the location management device. Therefore, the location management device determines the location of the terminal device based on the first measurement result and the second measurement result. This helps improve positioning precision.

In another possible implementation, the first access network device includes a first CU.

In the foregoing implementation, in a scenario in which an access network device uses a CU-DU split structure, the first access network device may be the first CU. It can be learned that the technical solution of this application is further applicable to a CU-DU split scenario. This enriches application scenarios of the technical solution of this application.

According to a second aspect, this application provides a communication method, including:

A first access network device receives time information from a location management device, where the time information indicates to measure, after a reference time indicated by the time information, an $X^{th}$ sounding parameter signal SRS sent by a terminal device, and X is an integer greater than or equal to 1. The first access network device sends a first measurement result to the location management device, where the first measurement result is obtained by measuring an SRS of the terminal device based on the time information.

In the foregoing technical solution, the time information indicates to measure, after the reference time indicated by the time information, the $X^{th}$ sounding parameter signal SRS sent by the terminal device. The first access network device sends the first measurement result to the location management device. The first measurement result is obtained by measuring the SRS of the terminal device based on the time information. Therefore, this helps improve positioning precision of positioning the terminal device by the location management device. For example, the location management device collects measurement results of a plurality of access network devices. The measurement results of the plurality of access network devices may be obtained by measuring, by the plurality of access network devices, the SRS of the terminal device based on the time information. Therefore, this helps improve accuracy of determining the location of the terminal device by the location management device, and improve positioning precision. Further, when X is equal to 1, the time information indicates to measure, after the reference time indicated by the time information, a $1^{st}$ SRS sent by the terminal device. The access network device that receives the time information may measure the $1^{st}$ SRS sent by the terminal device after the reference time, to reduce a measurement delay, and improve positioning efficiency.

In a possible implementation, the time information includes at least one of the following: a UTC, a relative time 1900, a system frame number, or a slot number.

In the foregoing implementation, the location management device may indicate, by using an absolute time (for example, the UTC or the relative time 1900), a reference time for measuring the SRS. Alternatively, the location management device indicates, by using the system frame number and the slot number, a reference time for measuring the SRS. In this way, the first access network device measures the SRS of the terminal device based on the reference time indicated by the time information, to improve positioning precision of the terminal device.

In another possible implementation, the time information further indicates to measure, after the reference time indicated by the time information plus an integer multiple of a measurement periodicity, the $X^{th}$ SRS sent by the terminal device.

The foregoing implementation is applicable to a scenario of periodically measuring an SRS. The time information may indicate to measure, after the reference time indicated by the time information plus an integer multiple of a measurement periodicity, the $X^{th}$ SRS sent by the terminal device. In this way, the first access network device and the second access network device measure, in each measurement periodicity, an SRS sent by the terminal device at a same moment. In this way, positioning precision of positioning calculation performed on the terminal device by the location management device is improved.

In another possible implementation, the time information is carried in a measurement reference time information element, or carried in a reference time information element, or carried in a measurement time information element.

The foregoing implementation shows an information element carrying time information, which helps the first access network device parse the time information. In other words, the first access network device may obtain corresponding time information by parsing content of the information element. In this way, the first access network device measures the SRS of the terminal device based on the reference time indicated by the time information, to improve positioning precision of the terminal device.

In another possible implementation, the time information received by the first access network device is carried in a first request message, and the first measurement result is carried in a first response message.

In the foregoing implementation, the location management device may interact with the first access network device via a request message and a response message, so that the location management device delivers the time information and collects the first measurement result. In this way, the location management device determines the location of the terminal device based on measurement results of a plurality of access network devices, thereby accurately positioning the terminal device.

In another possible implementation, the first request message includes a first measurement request message, and the first response message includes a first measurement response message.

The foregoing implementation shows specific forms of the request message and the response message. In other words, the first access network device may interact with the location management device via an existing message. Therefore, there is no need to define a new message, thereby improving adaptability of the solution to a current communication system, and improving practicability of the solution.

In another possible implementation, the first access network device includes a first central unit (CU); and after that a first access network device receives time information from a location management device, and before that the first access network device sends a first measurement result to the location management device, the method further includes:

The first CU sends the time information to a first distributed unit (DU), and the first CU receives the first measurement result from the first DU.

The foregoing implementation shows a specific implementation process of applying the communication method in this application when the access network device uses a CU-DU split structure. The first CU receives the time information from the location management device. Then, the first CU may send the time information to the first DU, to request the first DU to measure, based on the time information, the SRS sent by the terminal device. In this way, the first DU measures the SRS of the terminal device based on the time information, and feeds back the first measurement result.

In another possible implementation, the time information sent by the first CU to the first DU is carried in a third request message, and the first measurement result sent by the first DU and received by the first CU is carried in a third response message.

In the foregoing implementation, the first CU interacts with the first DU via a request message and a response message, so that the first CU sends the time information to the first DU and receives the first measurement result obtained by the first DU. In this way, the first CU feeds back the first measurement result to the location management device.

In another possible implementation, the third request message includes a first positioning measurement request message, and the third response message includes a first positioning measurement response message.

The foregoing implementation shows specific forms of the request message and the response message. The first CU may deliver the time information and obtain the first measurement result via an existing message. Therefore, there is no need to define a new message, thereby improving adaptability of the solution to a current communication system, and improving practicability of the solution.

A third aspect of this application provides a communication method, including a second access network device receives time information from a location management device, where the time information indicates to measure, after a reference time indicated by the time information, an $X^{th}$ sounding parameter signal SRS sent by a terminal device, and X is an integer greater than or equal to 1. The second access network device sends a second measurement result to the location management device, where the second measurement result is obtained by measuring an SRS of the terminal device based on the time information.

In the foregoing technical solution, the time information indicates to measure, after the reference time indicated by the time information, the $X^{th}$ sounding parameter signal SRS sent by the terminal device. The second access network device sends the second measurement result to the location management device. The second measurement result is obtained by measuring the SRS of the terminal device based on the time information. Therefore, this helps improve positioning precision of positioning the terminal device by the location management device. For example, the location management device collects measurement results of a plurality of access network devices, and positions the terminal device based on the measurement results of the plurality of access network devices. The measurement results of the plurality of access network devices may be obtained by measuring, by the plurality of access network devices, the SRS of the terminal device based on the time information. Therefore, this helps improve accuracy of determining the location of the terminal device by the location management device, and improve positioning precision. Further, when X is equal to 1, the time information indicates to measure, after the reference time indicated by the time information, a $1^{st}$ SRS sent by the terminal device. The access network device that receives the time information may measure the $1^{st}$ SRS sent by the terminal device after the reference time, to reduce a measurement delay, and improve positioning efficiency.

In a possible implementation, the time information includes at least one of the following: a UTC, a relative time 1900, a system frame number, or a slot number.

In the foregoing implementation, the location management device may indicate, by using an absolute time (for example, the UTC or the relative time 1900), a reference time for measuring the SRS. Alternatively, the location management device indicates, by using the system frame number and the slot number, a reference time for measuring the SRS. In this way, the second access network device measures the SRS of the terminal device based on the reference time indicated by the time information, to improve positioning precision of the terminal device.

In another possible implementation, the time information further indicates to measure, after the reference time indicated by the time information plus an integer multiple of a measurement periodicity, the $X^{th}$ SRS sent by the terminal device.

The foregoing implementation is applicable to a scenario of periodically measuring an SRS. The time information may indicate to measure, after the reference time indicated by the time information plus an integer multiple of a measurement periodicity, the $X^{th}$ SRS sent by the terminal device. In this way, the first access network device and the second access network device measure, in each measurement periodicity, an SRS sent by the terminal device at a same moment. In this way, positioning precision of positioning calculation performed on the terminal device by the location management device is improved.

In another possible implementation, the time information is carried in a measurement reference time information element, or carried in a reference time information element, or carried in a measurement time information element.

The foregoing implementation shows an information element carrying time information, which helps the second access network device parse the time information. In other words, the second access network device may obtain corresponding time information by parsing content of the information element. In this way, the second access network device measures the SRS of the terminal device based on the reference time indicated by the time information, to improve positioning precision of the terminal device.

In another possible implementation, the time information received by the second access network device is carried in a second request message, and the second measurement result is carried in a second response message.

In the foregoing implementation, the location management device may interact with the second access network device via a request message and a response message, so that the location management device delivers the time information and collects the second measurement result. In this way, the location management device determines the location of the terminal device based on measurement results of a plurality of access network devices, thereby accurately positioning the terminal device.

In another possible implementation, the second request message includes a second measurement request message, and the second response message includes a second measurement response message.

The foregoing implementation shows specific forms of the request message and the response message. In other words, the second access network device may interact with the location management device via an existing message. Therefore, there is no need to define a new message, thereby improving adaptability of the solution to a current communication system, and improving practicability of the solution.

In another possible implementation, the second access network device includes a second CU; and after that a second access network device receives time information from a location management device, and before that the second access network device sends a second measurement result to the location management device, the method further includes:

The second CU sends the time information to a second DU, and the second CU receives the second measurement result from the second DU.

The foregoing implementation shows a specific implementation process of applying the communication method in this application when the access network device uses a CU-DU split structure. The second CU receives the time information from the location management device. Then, the second CU may send the time information to the second DU, to request the second DU to measure, based on the time information, the SRS sent by the terminal device. In this way, the second DU measures the SRS of the terminal device based on the time information, and feeds back the second measurement result.

In another possible implementation, the time information sent by the second CU to the second DU is carried in a fourth request message, and the second measurement result sent by the second DU and received by the second CU is carried in a fourth response message.

In the foregoing implementation, the second CU interacts with the second DU via a request message and a response message, so that the second CU sends the time information to the second DU and receives the second measurement result obtained by the second DU. In this way, the second CU feeds back the second measurement result to the location management device.

In another possible implementation, the fourth request message includes a second positioning measurement request message, and the fourth response message includes a second positioning measurement response message.

The foregoing implementation shows specific forms of the request message and the response message. The second CU may deliver the time information and obtain the second measurement result via an existing message. Therefore, there is no need to define a new message, thereby improving adaptability of the solution to a current communication system, and improving practicability of the solution.

A fourth aspect of this application provides a communication method, including:

A first DU receives time information from a first CU, where the time information indicates to measure, after a reference time indicated by the time information, an $X^{th}$ SRS sent by a terminal device. The first DU sends a first measurement result to the first CU, where the first measurement result is obtained by measuring an SRS of the terminal device based on the time information.

In the foregoing technical solution, the time information indicates to measure, after the reference time indicated by the time information, the $X^{th}$ sounding parameter signal SRS sent by the terminal device. The first DU sends the first measurement result to the first CU. The first measurement result is obtained by measuring the SRS of the terminal device based on the time information. In this way, the first CU feeds back the first measurement result to a location management device. This helps improve positioning precision of positioning the terminal device by the location management device. For example, the location management device collects measurement results of a plurality of access network devices, and determines a location of the terminal device based on the measurement results of the plurality of access network devices. The measurement results of the plurality of access network devices may be obtained by measuring, by the plurality of access network devices, the SRS of the terminal device based on the time information. Therefore, this helps improve accuracy of determining the location of the terminal device by the location management device, and improve positioning precision. Further, when X is equal to 1, the time information indicates to measure, after the reference time indicated by the time information, a $1^{st}$ SRS sent by the terminal device. The first DU may measure the $1^{st}$ SRS sent by the terminal device after the reference time, to reduce a measurement delay, and improve positioning efficiency.

In a possible implementation, the time information includes at least one of the following: a UTC, a relative time 1900, a system frame number, or a slot number.

In the foregoing implementation, the first CU indicates, by using an absolute time (for example, the UTC or the relative time 1900), a reference time for measuring the SRS, or indicates, by using the system frame number and the slot number, a reference time for measuring the SRS. In this way, the first DU measures the SRS of the terminal device based on the reference time indicated by the time information, to improve positioning precision of the terminal device.

In another possible implementation, the time information is carried in a third request message, and the first measurement result is carried in a third response message.

In the foregoing implementation, the first CU interacts with the first DU via a request message and a response message, so that the first CU sends the time information to the first DU and receives the first measurement result obtained by the first DU. In this way, the first CU feeds back the first measurement result to the location management device.

In another possible implementation, the third request message includes a first positioning measurement request message, and the third response message includes a first positioning measurement response message.

The foregoing implementation shows specific forms of the request message and the response message. The first CU may interact with the first DU via an existing message. Therefore, there is no need to define a new message, thereby improving adaptability of the solution to a current communication system, and improving practicability of the solution.

A fifth aspect of this application provides a communication method, including:

A second DU receives time information from a second CU, where the time information indicates to measure, after a reference time indicated by the time information, an $X^{th}$ SRS sent by a terminal device. The second DU sends a second measurement result to the second CU, where the second measurement result is obtained by measuring an SRS of the terminal device based on the time information.

In the foregoing technical solution, the time information indicates to measure, after the reference time indicated by the time information, the $X^{th}$ sounding parameter signal SRS sent by the terminal device. The second DU sends the second measurement result to the second CU. The second measurement result is obtained by measuring the SRS of the terminal device based on the time information. In this way, the second CU feeds back the second measurement result to the location management device. This helps improve positioning precision of positioning the terminal device by the location management device. For example, the location management device collects measurement results of a plurality of access network devices, and determines a location of the terminal device based on the measurement results of the plurality of access network devices. The measurement results of the plurality of access network devices may be obtained by measuring, by the plurality of access network devices based on the time information, the SRS sent by the terminal device. Therefore, this helps improve accuracy of determining the location of the terminal device by the location management device, and improve positioning precision. Further, when X is equal to 1, the time information indicates to measure, after the reference time indicated by the time information, a $1^{st}$ SRS sent by the terminal device. The second DU may measure the $1^{st}$ SRS sent by the terminal device after the reference time, to reduce a measurement delay, and improve positioning efficiency.

In a possible implementation, the time information includes at least one of the following: a UTC, a relative time 1900, a system frame number, or a slot number.

In the foregoing implementation, the second CU indicates, by using an absolute time (for example, the UTC or the relative time 1900), a reference time for measuring the SRS, or indicates, by using the system frame number and the slot number, a reference time for measuring the SRS. In this way, the second DU measures the SRS of the terminal device based on the reference time indicated by the time information, to improve positioning precision of the terminal device.

In another possible implementation, the time information is carried in a fourth request message, and the second measurement result is carried in a fourth response message.

In the foregoing implementation, the second CU interacts with the second DU via a request message and a response message, so that the second CU sends the time information to the second DU and receives the second measurement result obtained by the second DU. In this way, the second CU feeds back the second measurement result to the location management device.

In another possible implementation, the fourth request message includes a second positioning measurement request message, and the fourth response message includes a second positioning measurement response message.

The foregoing implementation shows specific forms of the request message and the response message. The second CU may interact with the second DU via an existing message. Therefore, there is no need to define a new message, thereby improving adaptability of the solution to a current communication system, and improving practicability of the solution.

A sixth aspect of this application provides a communication apparatus. The communication apparatus includes: a sending unit, configured to: send time information to a first access network device, where the time information indicates to measure, after a reference time indicated by the time information, an $X^{th}$ SRS sent by a terminal device, and X is an integer greater than or equal to 1; and send the time information to a second access network device; and a receiving unit, configured to: receive a first measurement result from the first access network device, where the first measurement result is obtained by measuring an SRS of the terminal device based on the time information; and receive a second measurement result from the second access network device, where the second measurement result is obtained by measuring the SRS of the terminal device based on the time information.

In a possible implementation, the time information includes at least one of the following: a UTC, a relative time 1900, a system frame number, or a slot number.

In another possible implementation, the time information further indicates to measure, after the reference time indicated by the time information plus an integer multiple of a measurement periodicity, the $X^{th}$ SRS sent by the terminal device.

In another possible implementation, the time information is carried in a measurement reference time information element, or carried in a reference time information element, or carried in a measurement time information element.

In another possible implementation, the time information received by the first access network device is carried in a first request message, and the first measurement result is carried in a first response message. The time information received by the second access network device is carried in a second request message, and the second measurement result is carried in a second response message.

In another possible implementation, the first request message includes a measurement request message, the first response message includes a measurement response message, the second request message includes a measurement request message, and the second response message includes a measurement response message.

In another possible implementation, the communication apparatus further includes a processing unit.

The processing unit is configured to determine a location of the terminal device based on the first measurement result and the second measurement result.

In another possible implementation, the first access network device includes a first CU.

A seventh aspect of this application provides a communication apparatus. The communication apparatus includes: a receiving unit, configured to receive time information from a location management device, where the time information indicates to measure, after a reference time indicated by the time information, an $X^{th}$ sounding reference signal SRS sent by a terminal device, and X is an integer greater than or equal to 1; and a sending unit, configured to send a first measurement result to the location management device, where the first measurement result is obtained by measuring an SRS of the terminal device based on the time information.

In a possible implementation, the time information includes at least one of the following: a UTC, a relative time 1900, a system frame number, or a slot number.

In another possible implementation, the time information further indicates to measure, after the reference time indicated by the time information plus an integer multiple of a measurement periodicity, the $X^{th}$ SRS sent by the terminal device.

In another possible implementation, the time information is carried in a measurement reference time information element, or carried in a reference time information element, or carried in a measurement time information element.

In another possible implementation, the time information received by the communication apparatus is carried in a first request message, and the first measurement result is carried in a first response message.

In another possible implementation, the first request message includes a first measurement request message, and the first response message includes a first measurement response message.

In another possible implementation, the communication apparatus includes a first CU. The sending unit is further configured to: send the time information to the first DU; and the receiving unit is further configured to: receive the first measurement result from the first DU.

In another possible implementation, the time information sent by the first CU to the first DU is carried in a third request message, and the first measurement result sent by the first DU and received by the first CU is carried in a third response message.

In another possible implementation, the third request message includes a first positioning measurement request message, and the third response message includes a first positioning measurement response message.

An eighth aspect of this application provides a communication apparatus. The communication apparatus includes: a receiving unit, configured to receive time information from a location management device, where the time information indicates to measure, after a reference time indicated by the time information, an $X^{th}$ sounding reference signal SRS sent by a terminal device, and X is an integer greater than or equal to 1; and a sending unit, configured to send a second measurement result to the location management device, where the second measurement result is obtained by measuring an SRS of the terminal device based on the time information.

In a possible implementation, the time information includes at least one of the following: a UTC, a relative time 1900, a system frame number, or a slot number.

In another possible implementation, the time information further indicates to measure, after the reference time indicated by the time information plus an integer multiple of a measurement periodicity, the $X^{th}$ SRS sent by the terminal device.

In another possible implementation, the time information is carried in a measurement reference time information element, or carried in a reference time information element, or carried in a measurement time information element.

In another possible implementation, the time information received by the communication apparatus is carried in a second request message, and the second measurement result is carried in a second response message.

In another possible implementation, the second request message includes a second measurement request message, and the second response message includes a second measurement response message.

In another possible implementation, the communication apparatus includes a second CU. The sending unit is further configured to: send the time information to the second DU; and the receiving unit is further configured to: receive the second measurement result from the second DU.

In another possible implementation, the time information sent by the second CU to the second DU is carried in a fourth request message, and the second measurement result sent by the second DU and received by the second CU is carried in a fourth response message.

In another possible implementation, the fourth request message includes a second positioning measurement request message, and the fourth response message includes a second positioning measurement response message.

A ninth aspect of this application provides a communication apparatus. The communication apparatus includes: a receiving unit, configured to receive time information from a first CU, where the time information indicates to measure, after a reference time indicated by the time information, an $X^{th}$ SRS sent by a terminal device; and a sending unit, configured to send a first measurement result to the first CU, where the first measurement result is obtained by measuring an SRS of the terminal device based on the time information.

In a possible implementation, the time information includes at least one of the following: a UTC, a relative time 1900, a system frame number, or a slot number.

In another possible implementation, the time information is carried in a third request message, and the first measurement result is carried in a third response message.

In another possible implementation, the third request message includes a first positioning measurement request message, and the third response message includes a first positioning measurement response message.

A tenth aspect of this application provides a communication apparatus. The communication apparatus includes: a receiving unit, configured to receive time information from a second CU, where the time information indicates to measure, after a reference time indicated by the time information, an $X^{th}$ SRS sent by a terminal device; and a sending unit, configured to send a second measurement result to the second CU, where the second measurement result is obtained by measuring an SRS of the terminal device based on the time information.

In a possible implementation, the time information includes at least one of the following: a UTC, a relative time 1900, a system frame number, or a slot number.

In another possible implementation, the time information is carried in a fourth request message, and the second measurement result is carried in a fourth response message.

In another possible implementation, the fourth request message includes a second positioning measurement request message, and the fourth response message includes a second positioning measurement response message.

An eleventh aspect of this application provides a communication apparatus. The communication apparatus includes a processor and a memory. The memory stores a computer program or computer instructions, and the processor is configured to invoke and run the computer program or the computer instructions stored in the memory, so that the processor implements any one of the implementations of the first aspect to the fifth aspect.

Optionally, the communication apparatus further includes a transceiver, and the processor is configured to control the transceiver to perform any one of the implementations of the first aspect to the fifth aspect.

A twelfth aspect of this application provides a communication apparatus. The communication apparatus includes a processor. The processor is configured to invoke a computer program or computer instructions in a memory, so that the processor implements any one of the implementations of the first aspect to the fifth aspect.

Optionally, the communication apparatus further includes a transceiver, and the processor is configured to control the transceiver to perform any one of the implementations of the first aspect to the fifth aspect.

Optionally, the processor is integrated with the memory.

A thirteenth aspect of embodiments of this application provides a computer program product including computer instructions. When the computer program product runs on a computer, the computer is enabled to perform any one of the implementations of the first aspect to the fifth aspect.

A fourteenth aspect of embodiments of this application provides a computer-readable storage medium, including computer instructions. When the computer instructions are run on a computer, the computer is enabled to perform any one of the implementations of the first aspect to the fifth aspect.

A fifteenth aspect of this application provides a chip apparatus, including a processor, configured to invoke a computer program or computer instructions in a memory, to enable the processor to perform any one of the implementations of the first aspect and the second aspect.

Optionally, the processor is coupled to the memory through an interface.

A sixteenth aspect of embodiments of this application provides a communication system. The communication system includes the communication apparatus according to the sixth aspect, the communication apparatus according to the seventh aspect, and the communication apparatus according to the eighth aspect.

Optionally, the communication system further includes the communication apparatus according to the ninth aspect and the communication apparatus according to the tenth aspect.

For beneficial effects in any one of the implementations of the sixth aspect to the sixteenth aspect, refer to the related descriptions in corresponding implementations of the first aspect to the fifth aspect. Details are not described herein again.

It can be learned from the foregoing technical solutions that embodiments of this application have the following advantages.

It can be learned from the foregoing technical solutions that a location management device sends time information to a first access network device, where the time information indicates to measure, after a reference time indicated by the time information, an $X^{th}$ SRS sent by a terminal device, and X is an integer greater than or equal to 1. The location management device sends the time information to a second access network device. The location management device receives a first measurement result from the first access network device, where the first measurement result is obtained by measuring an SRS of the terminal device based on the time information. The location management device receives a second measurement result from the second access network device, where the second measurement result is obtained by measuring the SRS of the terminal device based on the time information. It can be learned that the location management device sends the time information to the first access network device and the second access network device, to indicate to measure, after the reference time indicated by the time information, the $X^{th}$ SRS sent by the terminal device, so as to improve positioning precision of positioning the terminal device by the location management device. For example, the first access network device and the second access network device may measure SRSs sent by the terminal device at a same time, and report corresponding measurement results. The location management device may determine a location of the terminal device based on the first measurement result and the second measurement result. Because the first measurement result and the second measurement result are obtained by measuring the SRS sent by the terminal device at a same moment, accuracy of determining the location of the terminal device by the location management device is improved, and positioning precision is improved.

DETAILED DESCRIPTION OF ILLUSTRATIVE EMBODIMENTS

Embodiments of this application provide a communication method and a related apparatus, to improve positioning precision of positioning a terminal device by a location management device.

The following clearly describes the technical solutions in embodiments of this application with reference to the accompanying drawings in embodiments of this application. It is clear that the described embodiments are merely some but not all of embodiments of this application. All other embodiments obtained by a person skilled in the art based on embodiments of this application without creative efforts shall fall within the protection scope of this application.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

Figure 1:
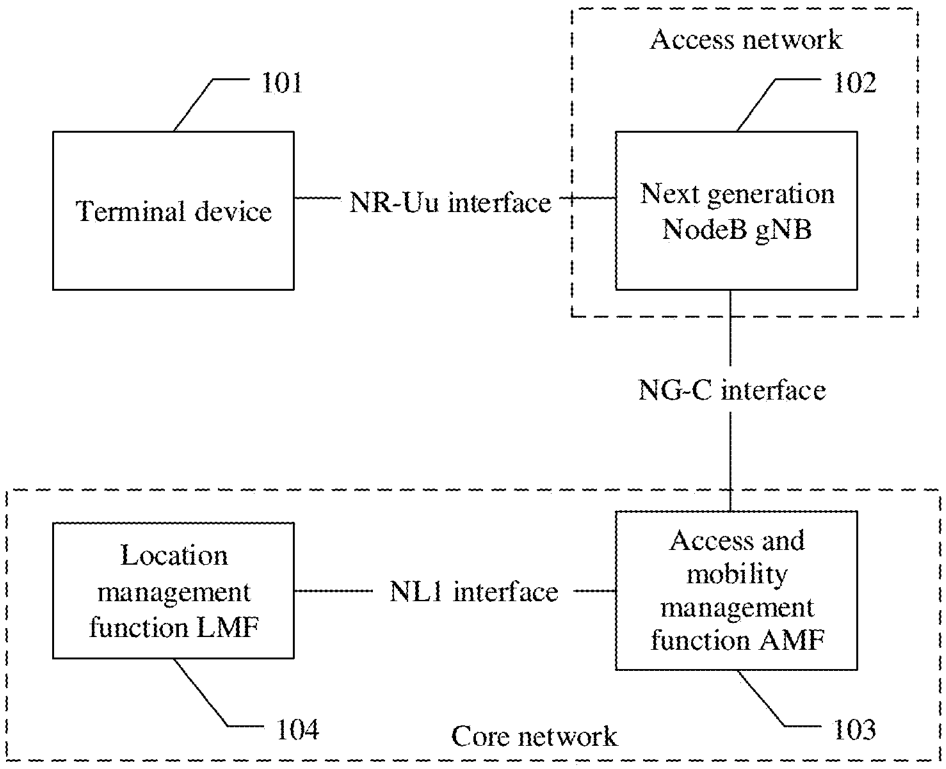
FIG. 1 is a schematic diagram of a communication system according to an embodiment of this application.

FIG. 1 is a schematic diagram of a communication system according to an embodiment of this application. The communication system includes a terminal device 101, a next generation NodeB (next Generation NodeB, gNB) 102, an access and mobility management function (access and mobility management function, AMF) 103, and a location management function (location management function, LMF) device 104.

The gNB 102 is an access network device in an access network. The terminal device 101 is connected to the gNB 102 in the access network through an NR-Uu interface. In the communication system shown in FIG. 1, a core network includes the AMF 103 and the LMF 104. The gNB 102 communicates with the AMF 103 through an NG-C interface. The AMF 103 communicates with the LMF 104 through an NL1 interface, and the AMF 103 is equivalent to a router for communication between the gNB 102 and the LMF 104. The LMF 104 is configured to perform positioning calculation and management on a location of the terminal device 101.

FIG. 1 shows only an example in which the communication system includes the gNB 102. In actual application, the communication system may further include more base stations, or the communication system includes only one base station. This is not specifically limited in this application.

The following describes the access network device and the terminal device provided in this application.

The access network device is an apparatus deployed in a radio access network for providing a wireless communication function for the terminal device. The access network device is a base station, and the base station is a macro base station, a micro base station (which is also referred to as a small cell), a relay station, an access point (access point, AP), a wearable device, a vehicle-mounted device, or the like in various forms. The base station may alternatively be a transmission and reception point (transmission and reception point, TRP), a transmission measurement function (transmission measurement function, TMF), or the like. For example, the base station in this application may be a base station in new radio (new radio, NR). The base station in the 5G NR may also be referred to as a transmission reception point (transmission reception point, TRP), a transmission point (transmission point, TP), the gNB shown in FIG. 1, or an evolved NodeB (evolved NodeB, eNB, or eNodeB) in a long term evolution (long term evolution, LTE) system.

The terminal device may also be referred to as user equipment (user equipment, UE), a mobile station (mobile station, MS), a mobile terminal (mobile terminal, MT), or the like. A terminal device is a device that includes a wireless communication function (providing voice/data connectivity to a user), for example, a handheld device or a vehicle-mounted device having a wireless connection function. Currently, some examples of the terminal device are a mobile phone (mobile phone), a tablet computer, a laptop computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), or a wireless terminal in a smart home (smart home).

The AMF 103 is responsible for access control, registration management, service management, mobility management, and the like for the terminal device to access a network.

The LMF 104 is configured to perform positioning calculation and management on the location of the terminal device.

In this application, a name of the AMF 103 may change with evolution of the communication system. In a current communication system or a future communication system, any functional network element that has another name and has a function similar to that of the AMF 103 may be understood as the AMF 103 in this application, and is applicable to the communication method provided in embodiments of this application.

In this application, the LMF device is a name in the current communication system. In the future communication system, a name of the LMF device may change with evolution of the communication system. Therefore, the LMF device is referred to as a location management device below to describe the technical solutions of this application. The location management device is configured to perform positioning calculation on the position of the terminal device. In the current communication system or the future communication system, any functional network element that has another name and has a function similar to that of the location management device may be understood as the location management device in this application, and is applicable to the communication method provided in this application.

The following describes a possible structure of the access network device in the access network in FIG. 1. Herein, an example in which the access network device is a gNB is used for description. This is also applicable to other types of access network devices.

Figure 2:
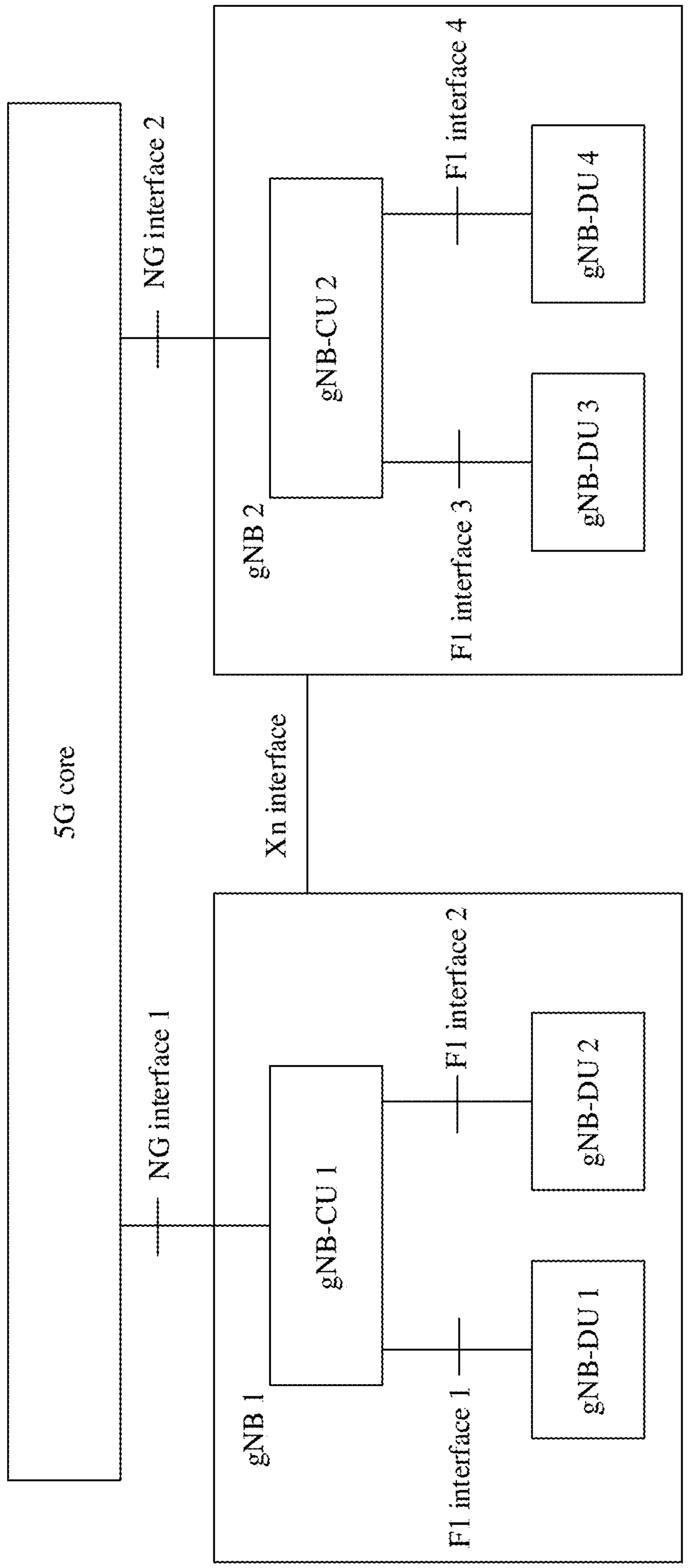
FIG. 2 is a schematic diagram of a structure of an access network device according to an embodiment of this application.

FIG. 2 is a schematic diagram of a structure of a gNB according to an embodiment of this application. Refer to FIG. 2. In a 5G communication system, gNBs are connected to each other through an Xn interface, and the gNB is connected to a 5th generation mobile communication technology core (the 5th generation mobile communication technology core, 5GC) through an NG interface. As shown in FIG. 2, a gNB 1 and a gNB 2 are connected to each other through the Xn interface. The gNB 1 is connected to the 5GC through an NG interface 1, and the gNB 2 is connected to the 5GC through an NG interface 2.

The gNB may include a CU and a DU. In other words, functions of the base station are divided, some functions of the base station are deployed on one gNB-CU, and remaining functions are deployed on a gNB-DU. A plurality of gNB-DUs share one gNB-CU. This can reduce costs and facilitate network expansion. For example, as shown in FIG. 2, the gNB 1 includes a gNB-CU 1, a gNB-DU 1, and a gNB-DU 2. The gNB-CU 1 is connected to the gNB-DU 1 through an F1 interface 1, and is connected to the gNB-DU 2 through an F1 interface 2. A structure of the gNB 2 is similar to a structure of the gNB 1. Details are not described herein again.

The gNB-CU and the gNB-DU may be divided based on a protocol stack. For example, protocol stacks of a radio resource control (radio resource control, RRC) layer, a service data adaptation protocol (service data adaptation protocol, SDAP) layer, and a packet data convergence protocol (packet data convergence protocol, PDCP) layer are deployed on the gNB-CU. Protocol stacks of a radio link control (radio link control, RLC) layer, a media access control (media access control, MAC) layer, and a physical (physical, PHY) layer are deployed on the gNB-DU. The gNB-CU and the gNB-DU are connected through an F1 interface. The foregoing example is merely used to describe the gNB-CU and the gNB-DU. Protocol stacks deployed on the gNB-CU and the gNB-DU are not limited in this application.

In this application, in the following solution in which the access network device uses a CU-DU structure, the CU in the access network device is referred to as a CU for short, and the DU in the access network device is referred to as a DU for short.

Currently, in an uplink positioning technology, a location management device sends a measurement request message to at least two base stations, to request to measure an SRS sent by a terminal device. The at least two base stations receive the measurement request message from the location management device. The at least two base stations may measure the SRS sent by the terminal device to obtain measurement results, and report the measurement results to the location management device. The location management device may determine a location of the terminal device based on the measurement results reported by the at least two base stations.

However, because transmission delays between the location management device and the at least two base stations are different, the at least two base stations receive corresponding measurement request messages at different time points. After a moment at which the base station receives the measurement request message of the location management device, the base station may measure a $1^{st}$ SRS sent by the terminal device and obtain a measurement result. Different base stations receive corresponding measurement request messages at different time points. As a result, the different base stations measure SRSs sent by the terminal device at different moments. In other words, the measurement results obtained by the at least two base stations are obtained by measuring, by the at least two base stations, the SRSs sent by the terminal device at different moments. However, if the location management device obtains the measurement results reported by the at least two base stations, and calculates the location of the terminal device based on the measurement results reported by the at least two base stations, the location of the terminal device is inaccurate. As a result, positioning precision is low. For example, the terminal device is in a moving state, and the location of the terminal device is different at different moments. The measurement results obtained by the location management device are obtained by measuring, by the at least two base stations, the SRSs sent by the terminal device at different moments. Consequently, if the location management device determines the location of the terminal device based on the measurement results of the at least two base stations, the location of the terminal device is inaccurate. As a result, positioning precision is low.

Figure 3:
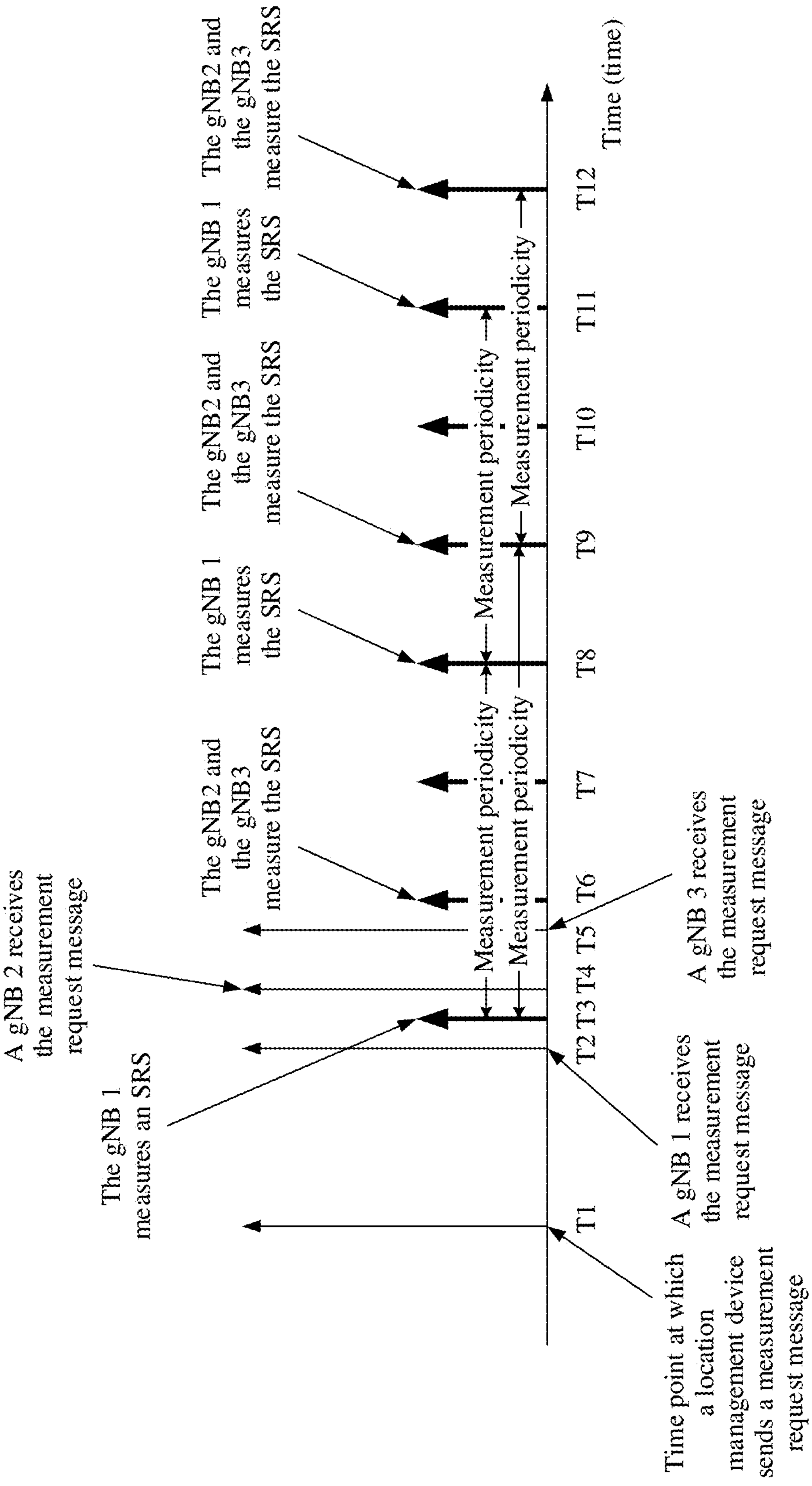
FIG. 3 is a schematic diagram of a positioning scenario in a current uplink positioning solution.

For example, as shown in FIG. 3, the terminal device periodically sends the SRS. The location management device sends corresponding measurement request messages to the gNB 1, the gNB 2, and a gNB 3 at a moment T1. The gNB 1 receives the measurement request message from the location management device at a moment T2. The gNB 1 measures the SRS sent by the terminal device at a moment T3 to obtain a measurement result 1, and sends the measurement result 1 to the location management device. The gNB 2 receives the measurement request message from the location management device at a moment T4. The gNB 3 receives the measurement request message from the location management device at a moment T5. The gNB 2 measures the SRS sent by the terminal device at a moment T6 to obtain a measurement result 2, and sends the measurement result 2 to the location management device. The gNB 3 measures the SRS sent by the terminal device at the moment T6 to obtain a measurement result 3, and sends the measurement result 3 to the location management device. The location management device calculates the location of the terminal device based on the measurement result 1, the measurement result 2, and the measurement result 3. The measurement result 1, the measurement result 2, and the measurement result 3 are obtained by measuring the SRSs at different moments. As a result, positioning precision of positioning the terminal device by the location management device is low. Similarly, in a scenario in which the SRS is periodically measured, times for the gNB 1, and the gNB 2 and the gNB 3 to measure the SRSs are always staggered. As shown in FIG. 3, the gNB 1, and the gNB 2 and the gNB 3 measure the SRSs sent by the terminal device at different moments. The measurement results obtained by the location management device are obtained by measuring the SRSs at different moments. As a result, positioning precision of positioning the terminal device by the location management device is low. For example, the terminal device is in a moving state, and the location of the terminal device is different at different moments. The measurement results obtained by the location management device are obtained by measuring, by different gNBs, the SRSs sent by the terminal device at different moments. Consequently, accuracy of determining the location of the terminal device by the location management device based on the measurement results of the plurality of gNBs is low. As a result, positioning precision is low.

In view of this, this application provides a communication method. A location management device sends time information to at least two access network devices. The time information indicates to measure, after a reference time indicated by the time information, an $X^{th}$ SRS sent by a terminal device. In this way, the at least two access network devices measure, based on the time information, an SRS sent by the terminal device. In other words, the at least two access network devices may measure SRSs sent by the terminal device at a same time, and report corresponding measurement results. This helps improve positioning precision of positioning the terminal device by the location management device. For example, the location management device determines the location of the terminal device based on the measurement results reported by the at least two access network devices. This helps improve accuracy of determining the location of the terminal device by the location management device, and improve positioning precision.

The technical solutions of this application are described below with reference to specific embodiments. It should be noted that in the following embodiments, an example in which the location management device sends time information to two access network devices (including a first access network device and a second access network device) is used to describe the technical solutions of this application.

Figure 4:
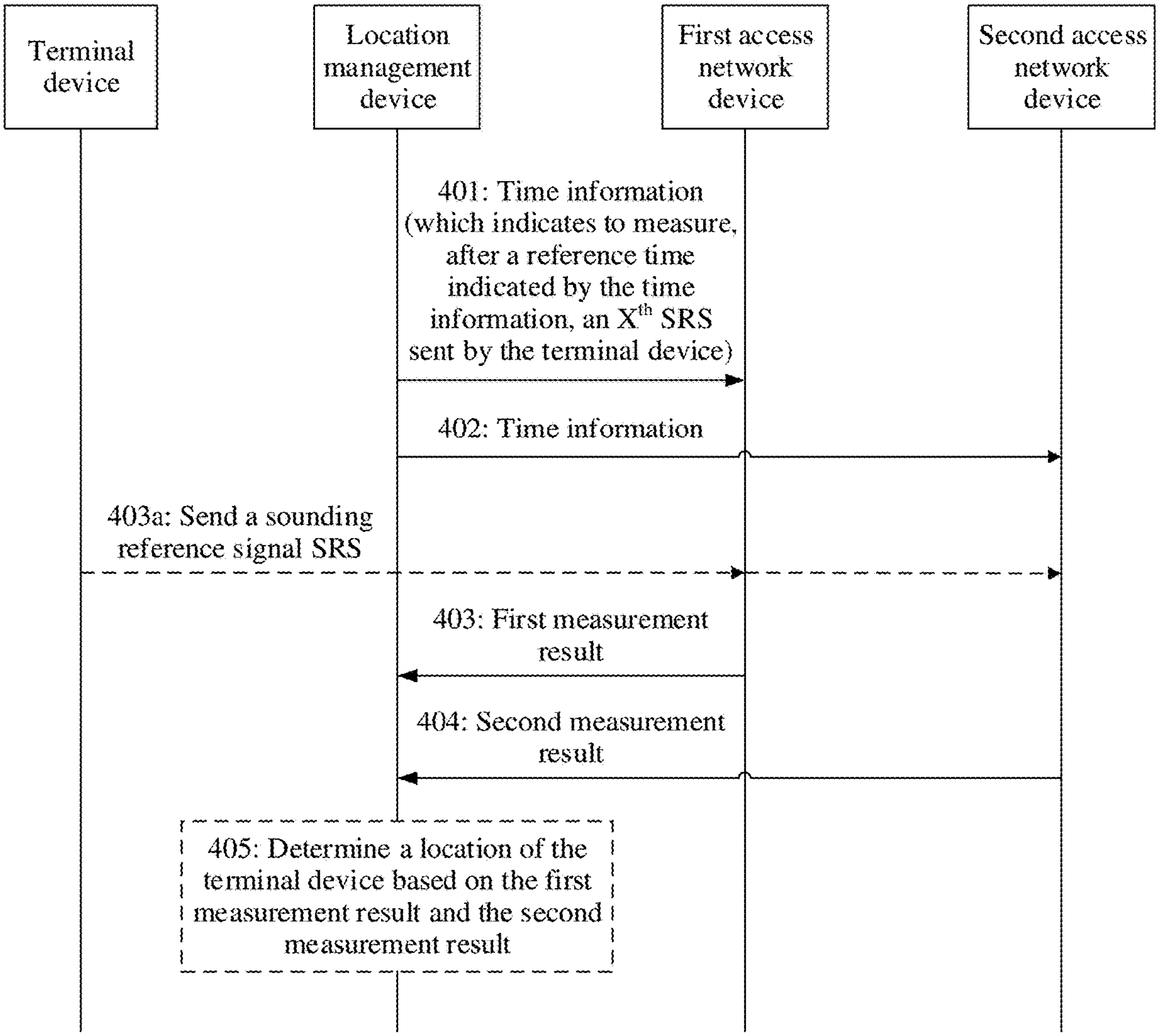
FIG. 4 is a schematic diagram of an embodiment of a communication method according to an embodiment of this application.

FIG. 4 is a schematic diagram of an embodiment of a communication method according to an embodiment of this application. Refer to FIG. 4. The communication method includes the following steps.

401: A location management device sends time information to a first access network device. The time information indicates to measure, after a reference time indicated by the time information, an $X^{th}$ SRS sent by a terminal device. X is an integer greater than or equal to 1. Correspondingly, the first access network device receives the time information from the location management device.

The time information indicates to measure, at the reference time indicated by the time information, an SRS sent by the terminal device; or the time information indicates to measure, after the reference time indicated by the time information, the $X^{th}$ SRS sent by the terminal device. In other words, if the reference time indicated by the time information is exactly a time at which the terminal device sends the SRS, the access network device that receives the time information may measure the SRS at the reference time. If the terminal device sends the SRS after the reference time, the access network device that receives the time information may measure, after the reference time, the $X^{th}$ SRS sent by the terminal device. For example, the time information indicates to measure, after the reference time indicated by the time information, a $1^{st}$ SRS sent by the terminal device. In this case, the access network device that receives the time information may measure the $1^{st}$ SRS sent by the terminal device after the reference time. Therefore, a positioning delay caused by a measurement delay is reduced, and positioning efficiency is improved. For example, the location management device is an LMF device.

Optionally, the time information sent by the location management device to the first access network device is carried in a first request message.

For example, the first request message is a first measurement request (measurement request) message. In other words, the time information may be delivered to the first access network device in a process in which the location management device delivers the first measurement request message.

Figure 5:
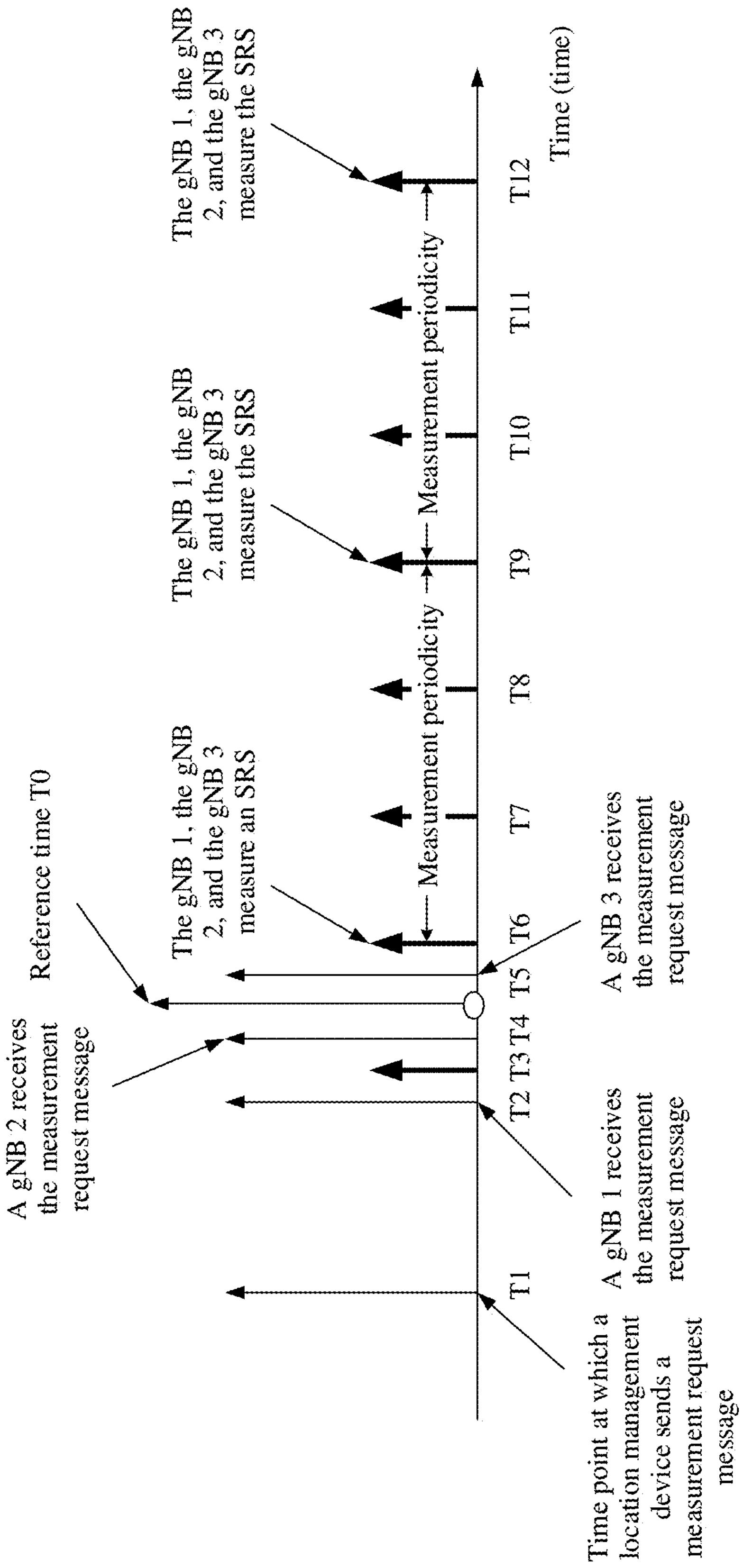
FIG. 5 is a schematic diagram of a positioning scenario of a communication method according to an embodiment of this application.

For example, as shown in FIG. 5, the reference time is a moment T0, a gNB 1 receives a measurement request message at a moment T2, a gNB 2 receives the measurement request message at a moment T4, and a gNB 3 receives the measurement request message at a moment T5. After the reference time T0, the terminal device sends the $1^{st}$ SRS at a moment T6. The gNB 1, the gNB 2, and the gNB 3 may measure the SRS sent by the terminal device at the moment T6.

In some implementations, the time information further indicates to measure, after the reference time indicated by the time information plus an integer multiple of a measurement periodicity, the $X^{th}$ SRS sent by the terminal device.

In a scenario in which the SRS is periodically measured, the location management device sends the measurement periodicity to the first access network device. The first access network device may measure, after the reference time indicated by the time information plus the integer multiple of the measurement periodicity, the $X^{th}$ SRS sent by the terminal device. For example, X is equal to 1, that is, the time information further indicates to measure, after the reference time indicated by the time information plus the integer multiple of the measurement periodicity, the $1^{st}$ SRS sent by the terminal device. Therefore, a positioning delay caused by a measurement delay is reduced, and positioning efficiency is improved.

Optionally, that the location management device sends the measurement periodicity to the first access network device includes: The location management device sends the first measurement request message to the first access network device, where the first measurement request message includes the measurement periodicity and the time information. After the first access network device receives the first measurement request message, the first access network device may measure, based on the measurement periodicity, the SRS sent by the terminal device.

It should be noted that the location management device may send the measurement periodicity and the time information to the first access network device via a same message (for example, the first measurement request message), or may send the measurement periodicity and the time information to the first access network device via different messages. This is not specifically limited in this application.

For example, as shown in FIG. 5, the measurement periodicity is T, and X is 1. The gNB 1, the gNB 2, and the gNB 3 may measure, after the reference time T0, the $1^{st}$ SRS sent by the terminal device (that is, the SRS sent by the terminal device at the moment T6). The gNB 1, the gNB 2, and the gNB 3 may measure, after a time T0+T, the $1^{st}$ SRS sent by the terminal device (that is, the SRS sent by the terminal device at a moment T9). The gNB 1, the gNB 2, and the gNB 3 may measure, after a time T0+2T, the $1^{st}$ SRS sent by the terminal device (that is, the SRS sent by the terminal device at a moment T12). By analogy, the gNB 1, the gNB 2, and the gNB 3 may measure, after T0+NT, the $1^{st}$ SRS sent by the terminal device. N is an integer greater than or equal to 3.

It should be noted that optionally, a periodicity for the terminal device to send the SRS is usually less than the measurement periodicity, to ensure that the access network device measures the SRS as soon as possible in the measurement periodicity, to obtain a measurement result. This avoids a high measurement delay affecting positioning efficiency because a next periodicity for the terminal device to send the SRS starts to wait exactly when the access network device receives the measure In some implementations, the time information includes at least one of the following: a UTC, a relative time 1900 (relative time 1900), a system frame number, or a slot number.

The relative time 1900 includes a time value indicated by 64 bits in a time unit of second, and a time obtained by adding 00:00:00 on Jan. 1, 1900 (00:00:00) (which is calculated as a continuous time without leap seconds and can be traced to the common time reference) to the time value. Binary code of an integral part of the time value is in the first 32 bits in the 64 bits, and binary code of a fractional part of the time value is in the last 32 bits in the 64 bits. The fractional part is represented by a granularity of $\frac{1}{2}^{32}$. To be specific, a value of the first 32 bits is S seconds, and a value of the last 32 bits is multiplied by $\frac{1}{2}^{32}$ to obtain Y seconds. Therefore, the reference time indicated by the time information is a time obtained by adding S seconds and Y seconds to 00:00:00 (00:00:00) on Jan. 1, 1900.

Optionally, the time information is carried in a measurement reference time (measurement reference time) information element. It should be noted that a name of the measurement reference time information element is not limited in this application, and the measurement reference time information element is merely an example, for example, may also be referred to as a measurement time information element, a reference time information element, or the like.

For example, the first measurement request message includes the measurement reference time information element, and the time information is carried in the measurement reference time information element.

In a possible implementation, the first measurement request message includes the measurement reference time information element, and the relative time 1900 is carried in the measurement reference time information element. The following shows a representation form of the measurement reference time information element with reference to Table 1. Details are shown in Table 1.

TABLE 1

| Information element or group name IE/Group Name | Range (Range) | Information element type and reference (IE type and reference) | Semantics description (semantics description) |
|---|---|---|---|
| Measurement reference time (measurement reference time) | | Relative time 1900 (Relative Time 1900) | |

It can be learned from Table 1 that content of the measurement reference time information element is the relative time 1900, and the reference time is indicated by the relative time 1900.

In another possible implementation, the first measurement request message includes the measurement reference time information element, and the time information includes a system frame number and a slot number. In a possible implementation, the measurement reference time information element includes a system frame number sub-information element and a slot number sub-information element. The system frame number sub-information element carries the system frame number. The slot number sub-information element carries the slot number. The following shows a representation form of the measurement reference time information element with reference to Table 2. Details are shown in Table 2.

TABLE 2

| Information element or group name IE/Group Name | Range (Range) | Information element type and reference (IE type and reference) | Semantics description (semantics description) |
|---|---|---|---|
| Measurement reference time | | | |
| > System frame number | | INTEGER (0 . . . 1023) | |
| > Slot number | | INTEGER (0 . . . 79) | |

It can be learned from Table 2 that a value of the system frame number sub-information element represents the system frame number, and a value of the slot number sub-information element represents the slot number. The location management device indicates, by using both the system frame number and the slot number, a slot in which the reference time is located, to indicate to measure, within the slot in which the reference time is located or after the slot in which the reference time is located, the $X^{th}$ SRS sent by the terminal device.

In a possible implementation, the first measurement request message includes the measurement reference time information element. The measurement reference time information element includes a reference time sub-information element, the system frame number sub-information element, and the slot number sub-information element. The following shows a representation form of the measurement reference time information element with reference to Table 3. Details are shown in Table 3.

TABLE 3

| Information element or group name IE/Group Name | Range (Range) | Information element type and reference (IE type and reference) | Semantics description (semantics description) |
|---|---|---|---|
| Measurement reference time | | | |
| > Reference time | | Relative time 1900 | |
| > System frame number | | INTEGER (0 . . . 1023) | |
| > Slot number | | INTEGER (0 . . . 79) | |

It can be learned from some examples of the measurement reference time information element that the measurement reference time information element carries at least one piece of the following information: the UTC, the relative time 1900 (relative time 1900), the system frame number, or the slot number. The location management device may flexibly include some or all of the information shown above in the measurement reference time information element. For example, the measurement reference time information element may carry the UTC or the relative time 1900. Alternatively, the measurement reference time information element carries the system frame number and the slot number.

It should be noted that optionally, the time information may be set in combination with transmission delays between the location management device and the at least two access network devices. For example, as shown in FIG. 5, the reference time T0 indicated by the time information may be determined in combination with transmission delays between the location management device and the gNB 1, the gNB 2, and the gNB 3. The reference time T0 may be before or after the gNB receives the measurement request message of the location management device. The gNB 1, the gNB 2, and the gNB 3 can measure, in a subsequent measurement process, the SRS sent by the terminal device at a same moment.

402: The location management device sends the time information to a second access network device. Correspondingly, the second access network device receives the time information from the location management device.

For the time information, refer to the related descriptions in step 401. Details are not described herein again.

Optionally, the time information sent by the location management device to the second access network device is carried in a second request message. For example, the second request message is a second measurement request message. In other words, the time information may be delivered to the second access network device in a process in which the location management device delivers the second measurement request message.

Optionally, the time information sent by the location management device to the second access network device is carried in the measurement reference time information element. For the measurement reference time information element, refer to the related descriptions in step 401. Details are not described herein again. In a possible implementation, the second measurement request message includes the measurement reference time information element. The measurement reference time information element carries the time information.

It should be noted that there is no fixed execution sequence between step 401 and step 402. Step 401 may be first performed and then step 402 is performed. Alternatively, step 402 may be first performed and then step 401 is performed. Alternatively, step 401 and step 402 are performed simultaneously based on a situation. This is not specifically limited in this application.

Optionally, the embodiment shown in FIG. 4 further includes step 403*a*. 403*a*: The terminal device sends the SRS.

For example, the terminal device may send the SRS based on an SRS sending periodicity. As shown in FIG. 5, the terminal device sends the SRS at the moment T3, the moment T6, a moment T7, a moment T8, the moment T9, a moment T10, a moment T11, and the moment T12.

There is no fixed execution sequence between step 403*a*, and step 401 and step 402. For example, step 403*a* may be performed during performing of step 401 and step 402. Alternatively, step 403*a* is performed after step 401 to step 402.

403: The first access network device sends a first measurement result to the location management device. Correspondingly, the location management device receives the first measurement result from the first access network device.

The first measurement result is obtained by measuring, based on the time information, the SRS sent by the terminal device. For example, the first measurement result includes a relative time of arrival (relative time of arrival, RTOA), an angle of arrival (angle of arrival, AOA), reference signal received power (reference signal received power, RSRP), and the like that are obtained by measuring, by the first access network device, the SRS of the terminal device.

Specifically, the first measurement result is obtained by measuring the $X^{th}$ SRS sent by the terminal device after the reference time indicated by the time information. X is an integer greater than or equal to 1. After the first access network device receives the time information, the first access network device may measure, based on the time information, the SRS sent by the terminal device, to obtain the first measurement result. For example, the first access network device may measure the $1^{st}$ SRS sent by the terminal device after the reference time indicated by the time information, to obtain the first measurement result.

For example, as shown in FIG. 5, the gNB 1 receives the measurement request message of the location management device at the moment T2. The reference time indicated by the time information is the moment T0. The gNB 1 may measure the $1^{st}$ SRS (that is, the SRS sent by the terminal device at the moment T6) sent by the terminal device after the reference time T0, to obtain the first measurement result. It can be learned that the gNB 1 measures the $1^{st}$ SRS sent by the terminal device after the reference time T0, so that a measurement delay can be reduced, and a positioning delay of the location management device can be reduced.

It should be noted that the gNB 1 may alternatively measure a non-$1^{st}$ SRS sent by the terminal device after the reference time T0. This helps ensure that a plurality of gNBs measure the SRS sent by the terminal device at a same moment. In other words, transmission delays between some gNBs and the location management device are high. Therefore, these gNBs receive the measurement request message of the location management device later. Therefore, the plurality of gNBs measure the non-$1^{st}$ SRS after the reference time T0, so that the plurality of gNBs measure the SRS sent by the terminal device at a same moment. In this way, positioning precision is improved.

It should be noted that if the reference time indicated by the time information is exactly the time at which the terminal device sends the SRS, the first measurement result may be obtained by measuring the SRS sent by the terminal device at the reference time.

Optionally, the first measurement result is carried in a first response message. For example, the first response message is a first measurement response (measurement response) message.

404: The second access network device sends a second measurement result to the location management device. Correspondingly, the location management device receives the second measurement result from the second access network device.

The second measurement result is obtained by measuring, based on the time information, the SRS sent by the terminal device. The second measurement result includes an RTOA, an AOA, RSRP, and the like that are obtained by measuring, by the second access network device, the SRS of the terminal device.

Specifically, the second measurement result is obtained by measuring the $X^{th}$ SRS sent by the terminal device after the reference time indicated by the time information. X is an integer greater than or equal to 1. After the second access network device receives the time information, the second access network device may measure, based on the time information, the SRS sent by the terminal device, to obtain the second measurement result. For example, the second access network device may measure the $1^{st}$ SRS sent by the terminal device after the reference time indicated by the time information, to obtain the second measurement result.

For example, as shown in FIG. 5, the gNB 2 receives the measurement request message at the moment T4. The reference time indicated by the time information is the moment T0. The gNB 2 may measure the $1^{st}$ SRS (that is, the SRS sent by the terminal device at the moment T6) sent by the terminal device after the reference time T0, to obtain the second measurement result. It can be learned that the gNB 2 measures the $1^{st}$ SRS sent by the terminal device after the reference time T0, so that a measurement delay can be reduced, and a positioning delay of the location management device can be reduced. The gNB 3 is similar to the gNB 2. Details are not described herein again.

It should be noted that the gNB 2 may alternatively measure a non-$1^{st}$ SRS sent by the terminal device after the reference time T0, so that a plurality of gNBs measure the SRS sent by the terminal device at a same moment. In other words, transmission delays between some gNBs and the location management device are high. Therefore, these gNBs receive the measurement request message of the location management device later. Therefore, the plurality of gNBs measure the non-$1^{st}$ SRS after the reference time T0, so that the plurality of gNBs measure the SRS sent by the terminal device at a same moment. In this way, positioning precision is improved.

It should be noted that if the reference time indicated by the time information is exactly the time at which the terminal device sends the SRS, the second measurement result may be obtained by measuring the SRS sent by the terminal device at the reference time.

Optionally, the second measurement result is carried in a second response message. For example, the second response message is a second measurement response message.

It should be noted that there is no fixed execution sequence between step 403 and step 404. Step 403 may be first performed and then step 404 is performed. Alternatively, step 404 may be first performed and then step 403 is performed. Alternatively, step 403 and step 404 are performed simultaneously based on a situation. This is not specifically limited in this application.

It should be noted that in a scenario in which the SRS is periodically measured, the first access network device and the second access network device measure a corresponding SRS in each measurement periodicity based on the time information, and report corresponding measurement results. In other words, the access network device may measure the SRS once in each measurement periodicity, and report the corresponding measurement result.

For example, in a scenario in which the SRS is periodically measured, according to the technical solution of this application, as shown in FIG. 5, the measurement periodicity is T, and X is 1. The gNB 1, the gNB 2, and the gNB 3 may measure, after the reference time T0, the $1^{st}$ SRS sent by the terminal device (that is, the SRS sent by the terminal device at the moment T6), and report corresponding measurement results to the location management device. The gNB 1, the gNB 2, and the gNB 3 may measure, after the time T0+T, the $1^{st}$ SRS sent by the terminal device (that is, the SRS sent by the terminal device at the moment T9), and report corresponding measurement results to the location management device. The gNB 1, the gNB 2, and the gNB 3 may measure, after the time T0+2T, the $1^{st}$ SRS sent by the terminal device (that is, the SRS sent by the terminal device at the moment T12), and report corresponding measurement results to the location management device. The rest can be deduced by analogy. In this way, the SRS is periodically measured and the measurement result is reported, thereby improving accuracy of positioning calculation performed by the location management device on the terminal device.

Optionally, the embodiment shown in FIG. 4 further includes step 405. Step 405 may be performed after step 403 and step 404.

405: The location management device determines a location of the terminal device based on the first measurement result and the second measurement result.

Specifically, the location management device determines the location of the terminal device based on the first measurement result, the second measurement result, and an uplink positioning method. For example, the uplink positioning method includes an uplink time difference of arrival (uplink time difference of arrival, UL-TDOA) or an uplink angle of arrival (uplink angle of arrival, UL-AOA). A specific positioning process of the UL-TDOA is as follows: The access network device measures the SRS sent by the terminal device, to obtain a plurality of uplink relative times of arrival (relative time of arrival, RTOA); and the location management device determines the location of the terminal device based on the plurality of RTOAs reported by the access network device. A specific positioning process of the UL-AOA is as follows: The access network device measures the SRS from the terminal device, to obtain a plurality of AOAs; and the location management device determines the location of the terminal device based on the plurality of AOAs reported by the access network device.

In an embodiment of this application, a location management device sends time information to a first access network device, where the time information indicates to measure, after a reference time indicated by the time information, an $X^{th}$ SRS sent by a terminal device, and X is an integer greater than or equal to 1. The location management device sends the time information to a second access network device. The location management device receives a first measurement result from the first access network device, where the first measurement result is obtained by measuring an SRS of the terminal device based on the time information. The location management device receives a second measurement result from the second access network device, where the second measurement result is obtained by measuring the SRS of the terminal device based on the time information. It can be learned that the location management device sends the time information to the first access network device and the second access network device, to indicate to measure, after the reference time indicated by the time information, the $X^{th}$ SRS sent by the terminal device. In this way, the first access network device and the second access network device measure, based on the time information, the SRS from the terminal device to obtain a measurement result. This helps improve positioning precision of positioning the terminal device by the location management device. For example, the first access network device and the second access network device may measure the SRS sent by the terminal device at a same time, and report corresponding measurement results. The location management device may determine the location of the terminal device based on the first measurement result and the second measurement result. Because the first measurement result and the second measurement result are obtained by measuring the SRS sent by the terminal device at a same moment, accuracy of determining the location of the terminal device by the location management device is improved. In this way, positioning precision is improved.

In this application, optionally, the first access network device and the second access network device may use the CU-DU split structure shown in FIG. 2. The following describes the technical solutions of this application by using an example in which the first access network device includes a first CU and a first DU, and the second access network device includes a second CU and a second DU.

Figure 6:
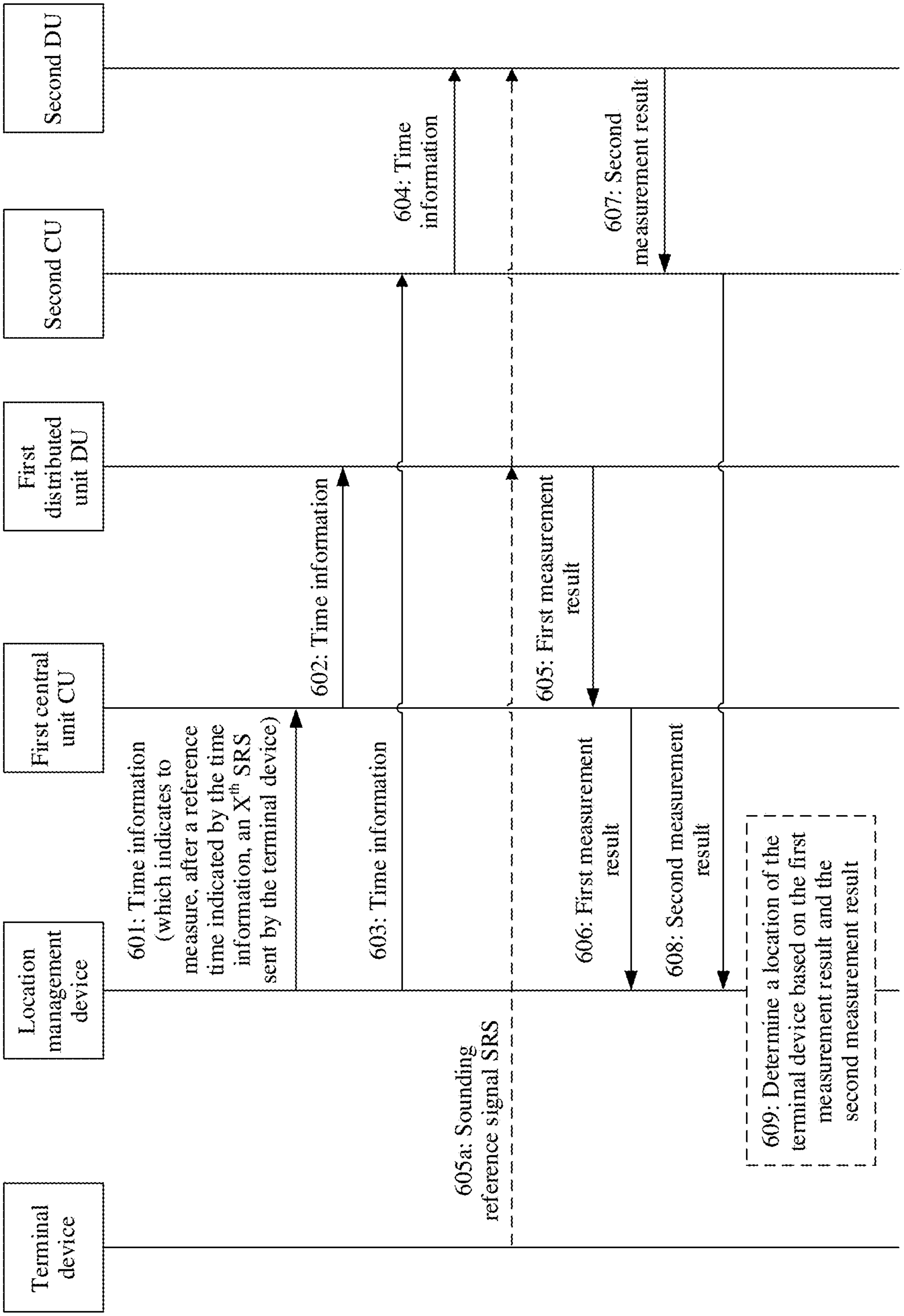
FIG. 6 is a schematic diagram of another embodiment of a communication method according to an embodiment of this application.

FIG. 6 is a schematic diagram of another embodiment of a communication method according to an embodiment of this application. Refer to FIG. 6. The communication method includes the following steps.

601: A location management device sends time information to a first CU. The time information indicates to measure, after a reference time indicated by the time information, an $X^{th}$ SRS sent by a terminal device. X is an integer greater than or equal to 1. Correspondingly, the first CU receives the time information from the location management device.

For related descriptions of the time information, refer to the related descriptions in step 401 in the embodiment shown in FIG. 4. Details are not described herein again. The location management device may be an LMF device.

It should be noted that optionally, the time information sent by the location management device to the first CU may be carried in a first request message. For example, the first request message includes a first measurement request message. In other words, the time information may be delivered to the first CU in a process in which the location management device delivers the first measurement request message.

Optionally, the time information is carried in a measurement reference time information element. For the measurement reference time information element, refer to the related descriptions in step 401 in the embodiment shown in FIG. 4. Details are not described herein again. In a possible implementation, the first measurement request message includes the measurement reference time information element, and the measurement reference time information element carries the time information.

602: The first CU sends the time information to a first DU. Correspondingly, the first DU receives the time information from the first CU.

For related descriptions of the time information, refer to the related descriptions in step 401 in the embodiment shown in FIG. 4. Details are not described herein again.

Specifically, the first CU receives the time information from the location management device. Then, the first CU may parse the time information, and send the time information to the first DU, to request the first DU to measure, based on the time information, an SRS sent by the terminal device.

Optionally, the time information sent by the first CU to the first DU may be carried in a third request message. For example, the third request message includes a first positioning measurement request (positioning measurement request) message. In other words, the first CU may send the first positioning measurement request message to the first DU, where the first positioning measurement request message includes the time information, to request the first DU to measure, based on the time information, the SRS sent by the terminal device.

Optionally, the time information is carried in a measurement reference time information element. For the measurement reference time information element, refer to the related descriptions in step 401 in the embodiment shown in FIG. 4. Details are not described herein again. For example, the first CU sends the first positioning measurement request message to the first DU, where the first positioning measurement request message includes the measurement reference time information element. The measurement reference time information element carries the time information.

603: The location management device sends the time information to a second CU. Correspondingly, the second CU receives the time information from the location management device.

For related descriptions of the time information, refer to the related descriptions in step 401 in the embodiment shown in FIG. 4. Details are not described herein again.

It should be noted that optionally, the time information sent by the location management device to the second CU may be carried in a second request message. For example, the second request message includes a second measurement request message. In other words, the time information may be delivered to the second CU in a process in which the location management device delivers the second measurement request message.

Optionally, the time information is carried in a measurement reference time information element. For the measurement reference time information element, refer to the related descriptions in step 401 in the embodiment shown in FIG. 4. Details are not described herein again. In a possible implementation, the second measurement request message includes the measurement reference time information element, and the measurement reference time information element carries the time information.

604: The second CU sends the time information to a second DU. Correspondingly, the second DU receives the time information from the second CU.

For related descriptions of the time information, refer to the related descriptions in step 401 in the embodiment shown in FIG. 4. Details are not described herein again.

Specifically, the second CU receives the time information from the location management device. Then, the second CU may parse the time information, and send the time information to the second DU, to request the second DU to measure, based on the time information, an SRS sent by the terminal device.

Optionally, the time information sent by the second CU to the second DU may be carried in a fourth request message. For example, the fourth request message includes a second positioning measurement request message. In other words, the second CU may send the second positioning measurement request message to the second DU, where the second positioning measurement request message includes the time information, to request the second DU to measure, based on the time information, the SRS sent by the terminal device.

Optionally, the time information is carried in a measurement reference time information element. For the measurement reference time information element, refer to the related descriptions in step 401 in the embodiment shown in FIG. 4. Details are not described herein again. In a possible implementation, the second CU sends the second positioning measurement request message to the second DU, where the second positioning measurement request message includes the measurement reference time information element. The measurement reference time information element carries the time information.

It should be noted that there is no fixed execution sequence between step 601 and step 602, and step 603 and step 604. Step 601 and step 602 may be first performed, and then step 603 and step 604 are performed. Alternatively, step 603 and step 604 are first performed, and then step 601 and step 602 are performed. Alternatively, step 601 and step 602, and step 603 and step 604 are simultaneously performed based on a situation. This is not specifically limited in this application.

Optionally, the embodiment shown in FIG. 6 further includes step 605*a*.

605*a*: The terminal device sends the SRS.

Step 605*a* is similar to step 403*a* in the embodiment shown in FIG. 4. For details, refer to the related descriptions in step 403*a* in the embodiment shown in FIG. 4. Details are not described herein again.

605: The first DU sends a first measurement result to the first CU. Correspondingly, the first CU receives the first measurement result from the first DU.

The first measurement result is obtained by measuring, by the first DU, the SRS of the terminal device based on the time information. For content of the first measurement result, refer to the related descriptions in the embodiment shown in FIG. 4. Details are not described herein again.

Specifically, the first measurement result is obtained by measuring, by the first DU after the reference time indicated by the time information, the $X^{th}$ SRS sent by the terminal device. X is an integer greater than or equal to 1. After the first DU receives the time information, the first DU may measure, based on the time information, the SRS sent by the terminal device, to obtain the first measurement result. For example, the first DU may measure the $1^{st}$ SRS sent by the terminal device after the reference time indicated by the time information, to obtain the first measurement result.

Optionally, the first measurement result is carried in a third response message. For example, the third response message includes a first positioning measurement response (positioning measurement response) message. In other words, the first DU sends the first positioning measurement response message to the first CU. The first positioning measurement response message includes the first measurement result. Correspondingly, the first CU receives the first positioning measurement response message from the first DU.

606: The first CU sends the first measurement result to the location management device. Correspondingly, the location management device receives the first measurement result from the first CU.

For the first measurement result, refer to the related descriptions in step 605.

Optionally, the first measurement result is carried in a first response message. For example, the first response message includes a first measurement response message. In other words, the first CU sends the first measurement response message to the location management device, and the first measurement response message includes the first measurement result. Correspondingly, the location management device receives the first measurement response message from the first CU.

607: The second DU sends a second measurement result to the second CU. Correspondingly, the second CU receives the second measurement result from the second DU.

The second measurement result is obtained by measuring, by the second DU, the SRS of the terminal device based on the time information. For content of the second measurement result, refer to the related descriptions in the embodiment shown in FIG. 4. Details are not described herein again.

Specifically, the second measurement result is obtained by measuring, by the second DU after the reference time indicated by the time information, the $X^{th}$ SRS sent by the terminal device. X is an integer greater than or equal to 1. After the second DU receives the time information, the second DU may measure, based on the time information, the SRS sent by the terminal device, to obtain the second measurement result. For example, the second DU may measure the $1^{st}$ SRS sent by the terminal device after the reference time indicated by the time information, to obtain the second measurement result.

Optionally, the second measurement result is carried in a fourth response message. For example, the fourth response message includes a second positioning measurement response message. In other words, the second DU sends the second positioning measurement response message to the second CU. The second positioning measurement response message includes the second measurement result. Correspondingly, the second CU receives the second positioning measurement response message from the second DU.

608: The second CU sends the second measurement result to the location management device. Correspondingly, the location management device receives the second measurement result from the second CU.

For the second measurement result, refer to the related descriptions in step 607.

Optionally, the second measurement result is carried in a second response message. For example, the second response message includes a second measurement response message. In other words, the second CU sends the second measurement response message to the location management device, and the second measurement response message includes the second measurement result. Correspondingly, the location management device receives the second measurement response message from the second CU.

It should be noted that there is no fixed execution sequence between step 605 and step 606, and step 607 and step 608. Step 605 and step 606 may be first performed, and then step 607 and step 608 are performed. Alternatively, step 607 and step 608 are first performed, and then step 605 and step 606 are performed. Alternatively, step 605 and step 606, and step 607 and step 608 are simultaneously performed based on a situation.

Optionally, the embodiment shown in FIG. 6 further includes step 609. Step 609 may be performed after step 606 and step 608.

609: The location management device determines a location of the terminal device based on the first measurement result and the second measurement result.

Step 609 is similar to step 405 in the embodiment shown in FIG. 4. For details, refer to the related descriptions in step 405 in the embodiment shown in FIG. 4. Details are not described herein again.

In the embodiment shown in FIG. 6, the first access network device and the second access network device use a CU-DU split structure. According to the technical solution of this application, the first DU in the first access network device measures the SRS of the terminal device based on the time information to obtain a measurement result, and the second DU in the second access network device measures the SRS of the terminal device based on the time information to obtain a measurement result. This helps improve positioning precision of positioning the terminal device by the location management device. For example, the first DU and the second DU may measure the SRS sent by the terminal device at a same time, and report corresponding measurement results. The location management device may determine a location of the terminal device based on the first measurement result and the second measurement result. Because the first measurement result and the second measurement result are obtained by measuring the SRS sent by the terminal device at a same moment, accuracy of determining the location of the terminal device by the location management device is improved, and positioning precision is improved.

Figure 7:
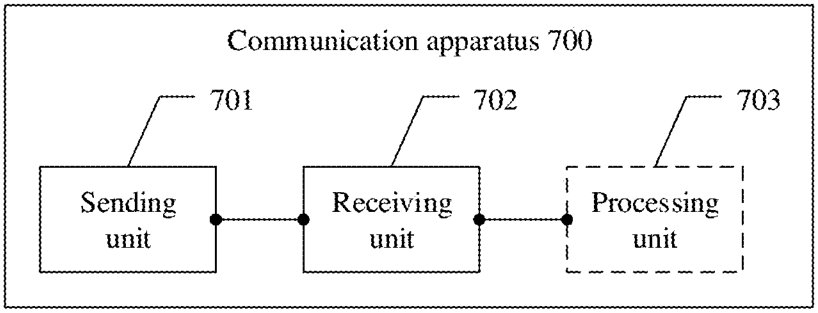
FIG. 7 is a schematic diagram of a structure of a communication apparatus according to an embodiment of this application.

A communication apparatus provided in this application is described below. FIG. 7 is a schematic diagram of a structure of a communication apparatus 700 according to an embodiment of this application. The communication apparatus 700 includes a sending unit 701 and a receiving unit 702. Optionally, the communication apparatus 700 further includes a processing unit 703.

When the communication apparatus 700 is a location management device or a chip in the location management device, the communication apparatus 700 may be configured to perform all or some of the steps performed by the location management device in the embodiments shown in FIG. 4 and FIG. 6. For details, refer to the related descriptions in the method embodiments shown in FIG. 4 and FIG. 6.

For example, the sending unit 701 is configured to perform step 401 and step 402 in the embodiment shown in FIG. 4. The receiving unit 702 is configured to perform step 403 and step 404 in the embodiment shown in FIG. 4. Optionally, the processing unit 703 is configured to perform step 405 in the embodiment shown in FIG. 4.

Specifically, the sending unit 701 sends time information to a first access network device, where the time information indicates to measure, after a reference time indicated by the time information, an $X^{th}$ SRS sent by a terminal device, and X is an integer greater than or equal to 1. The sending unit 701 sends the time information to a second access network device. The receiving unit 702 receives a first measurement result from the first access network device, where the first measurement result is obtained by measuring an SRS of the terminal device based on the time information. The receiving unit 702 receives a second measurement result from the second access network device, where the second measurement result is obtained by measuring the SRS of the terminal device based on the time information. It can be learned that the sending unit 701 sends the time information to the first access network device and the second access network device, to indicate to measure, after the reference time indicated by the time information, the $X^{th}$ SRS sent by the terminal device. In this way, positioning precision of positioning the terminal device by the location management device is improved. For example, the first access network device and the second access network device may measure the SRS sent by the terminal device at a same time, and report corresponding measurement results. The communication apparatus 700 may determine a location of the terminal device based on the first measurement result and the second measurement result. Because the first measurement result and the second measurement result are obtained by measuring the SRS sent by the terminal device at a same moment, accuracy of determining the location of the terminal device by the communication apparatus 700 is improved, and positioning precision is improved.

For example, the sending unit 701 is configured to perform step 601 and step 603 in the embodiment shown in FIG. 6. The receiving unit 702 is configured to perform step 606 and step 608 in the embodiment shown in FIG. 6. Optionally, the processing unit 703 is configured to perform step 609 in the embodiment shown in FIG. 6.

When the communication apparatus 700 is a first access network device or a chip in the first access network device, the communication apparatus 700 may be configured to perform all or some of the steps performed by the first access network device in the embodiments shown in FIG. 4 and FIG. 6. For details, refer to the related descriptions in the method embodiments shown in FIG. 4 and FIG. 6.

For example, the receiving unit 702 is configured to perform step 401 in the embodiment shown in FIG. 4. The sending unit 701 is configured to perform step 403 in the embodiment shown in FIG. 4. Optionally, the receiving unit 702 is configured to perform step 403*a* in the embodiment shown in FIG. 4.

Specifically, the receiving unit 702 is configured to receive time information from a location management device, where the time information indicates to measure, after a reference time indicated by the time information, an $X^{th}$ sounding parameter signal SRS sent by a terminal device, and X is an integer greater than or equal to 1. The sending unit 701 is configured to send a first measurement result to the location management device, where the first measurement result is obtained by measuring an SRS of the terminal device based on the time information. In this way, positioning precision of positioning the terminal device by the location management device is improved. For example, the location management device collects measurement results of a plurality of communication apparatuses. The measurement results of the plurality of communication apparatuses may be obtained by measuring, by the plurality of communication apparatuses, the SRS of the terminal device based on the time information. Therefore, this helps improve accuracy of determining the location of the terminal device by the location management device, and improve positioning precision. Further, when X is equal to 1, the time information indicates to measure, after the reference time indicated by the time information, a $1^{st}$ SRS sent by the terminal device. The plurality of communication apparatuses that receive the time information may measure the $1^{st}$ SRS sent by the terminal device after the reference time, to reduce a measurement delay, and improve positioning efficiency.

When the communication apparatus 700 is a first CU or a chip in the first CU, the communication apparatus 700 may be configured to perform all or some of the steps performed by the first CU in the embodiment shown in FIG. 6. For details, refer to the related descriptions in the method embodiment shown in FIG. 6.

For example, the sending unit 701 is configured to perform step 602 and step 606 in the embodiment shown in FIG. 6. The receiving unit 702 is configured to perform step 601 and step 605 in the embodiment shown in FIG. 6. Optionally, the receiving unit 702 is configured to perform step 605*a* in the embodiment shown in FIG. 6.

When the communication apparatus 700 is a second access network device or a chip in the second access network device, the communication apparatus 700 may be configured to perform all or some of the steps performed by the second access network device in the embodiments shown in FIG. 4 and FIG. 6. For details, refer to the related descriptions in the method embodiments shown in FIG. 4 and FIG. 6.

For example, the receiving unit 702 is configured to perform step 402 in the embodiment shown in FIG. 4. The sending unit 701 is configured to perform step 404 in the embodiment shown in FIG. 4. Optionally, the receiving unit 702 is configured to perform step 403*a* in the embodiment shown in FIG. 4.

Specifically, the receiving unit 702 is configured to receive time information from a location management device, where the time information indicates to measure, after a reference time indicated by the time information, an $X^{th}$ sounding parameter signal SRS sent by a terminal device, and X is an integer greater than or equal to 1. The sending unit 701 is configured to send a second measurement result to the location management device, where the second measurement result is obtained by measuring an SRS of the terminal device based on the time information. This helps improve positioning precision of positioning the terminal device by the location management device. For example, the location management device collects measurement results of a plurality of communication apparatuses. The measurement results of the plurality of communication apparatuses may be obtained by measuring, by the plurality of communication apparatuses, the SRS of the terminal device based on the time information. Therefore, this helps improve accuracy of determining the location of the terminal device by the location management device, and improve positioning precision. Further, when X is equal to 1, the time information indicates to measure, after the reference time indicated by the time information, a $1^{st}$ SRS sent by the terminal device. The plurality of communication apparatuses that receive the time information may measure the $1^{st}$ SRS sent by the terminal device after the reference time, to reduce a measurement delay, and improve positioning efficiency.

When the communication apparatus 700 is a second CU or a chip in the second CU, the communication apparatus 700 may be configured to perform all or some of the steps performed by the second CU in the embodiment shown in FIG. 6. For details, refer to the related descriptions in the method embodiment shown in FIG. 6.

For example, the sending unit 701 is configured to perform step 604 and step 608 in the embodiment shown in FIG. 6. The receiving unit 702 is configured to perform step 603 and step 607 in the embodiment shown in FIG. 6. Optionally, the receiving unit 702 is configured to perform step 605*a* in the embodiment shown in FIG. 6.

When the communication apparatus 700 is a first DU or a chip in the first DU, the communication apparatus 700 may be configured to perform all or some of the steps performed by the first DU in the embodiment shown in FIG. 6. For details, refer to the related descriptions in the method embodiment shown in FIG. 6.

For example, the receiving unit 702 is configured to perform step 602 in the embodiment shown in FIG. 6. The sending unit 701 is configured to perform step 605 in the embodiment shown in FIG. 6. Optionally, the receiving unit 702 is configured to perform step 605*a* in the embodiment shown in FIG. 6.

When the communication apparatus 700 is a second DU or a chip in the second DU, the communication apparatus 700 may be configured to perform all or some of the steps performed by the second DU in the embodiment shown in FIG. 6. For details, refer to the related descriptions in the method embodiment shown in FIG. 6.

For example, the receiving unit 702 is configured to perform step 604 in the embodiment shown in FIG. 6. The sending unit 701 is configured to perform step 607 in the embodiment shown in FIG. 6. Optionally, the receiving unit 702 is configured to perform step 605*a* in the embodiment shown in FIG. 6.

Figure 8:
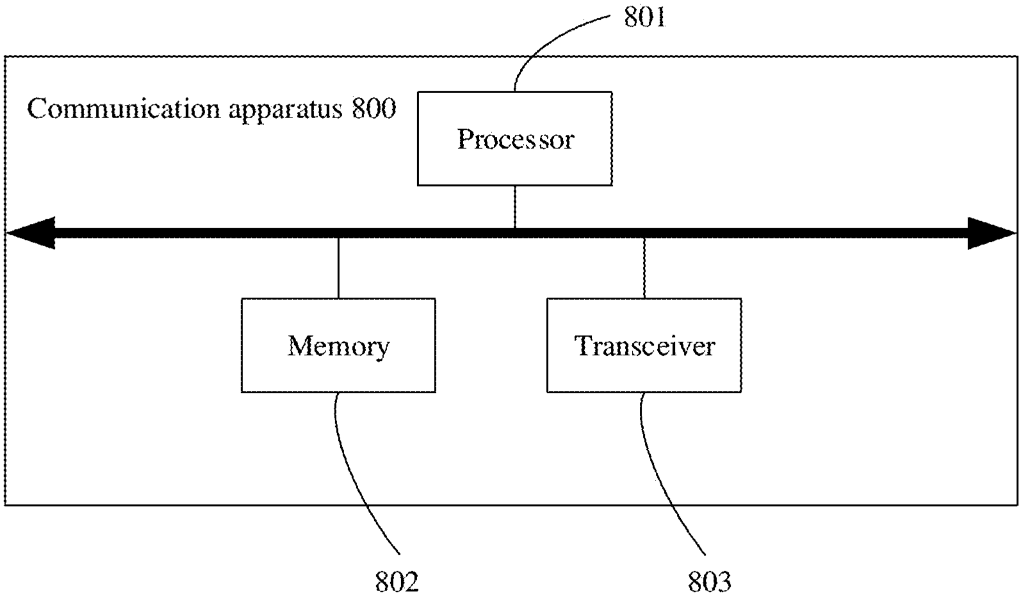
FIG. 8 is a schematic diagram of another structure of a communication apparatus according to an embodiment of this application.

This application further provides a communication apparatus. FIG. 8 is a schematic diagram of another structure of a communication apparatus 800 according to an embodiment of this application.

The communication apparatus 800 includes a processor 801, a memory 802, and a transceiver 803.

The processor 801, the memory 802, and the transceiver 803 all are connected through a bus, and the memory stores computer instructions.

When the communication apparatus 800 is a location management device or a chip in the location management device, the communication apparatus 800 may be configured to perform the steps performed by the location management device in the embodiments shown in FIG. 4 and FIG. 6. For details, refer to the related descriptions in the foregoing method embodiments.

When the communication apparatus 800 is a first access network device or a chip in the first access network device, the communication apparatus 800 may be configured to perform the steps performed by the first access network device in the embodiment shown in FIG. 4. For details, refer to the related descriptions in the foregoing method embodiment.

When the communication apparatus 800 is a second access network device or a chip in the second access network device, the communication apparatus 800 may be configured to perform the steps performed by the second access network device in the embodiment shown in FIG. 4. For details, refer to the related descriptions in the foregoing method embodiment.

When the communication apparatus 800 is a first CU or a chip in the first CU, the communication apparatus 800 may be configured to perform the steps performed by the first CU in the embodiment shown in FIG. 6. For details, refer to the related descriptions in the foregoing method embodiment.

When the communication apparatus 800 is a first DU or a chip in the first DU, the communication apparatus 800 may be configured to perform the steps performed by the first DU in the embodiment shown in FIG. 6. For details, refer to the related descriptions in the foregoing method embodiment.

When the communication apparatus 800 is a second CU or a chip in the second CU, the communication apparatus 800 may be configured to perform the steps performed by the second CU in the embodiment shown in FIG. 6. For details, refer to the related descriptions in the foregoing method embodiment.

When the communication apparatus 800 is a second DU or a chip in the second DU, the communication apparatus 800 may be configured to perform the steps performed by the second DU in the embodiment shown in FIG. 6. For details, refer to the related descriptions in the foregoing method embodiment.

The sending unit 701 and the receiving unit 702 shown in FIG. 7 may be specifically the transceiver 803. Therefore, specific implementation of the transceiver 803 is not described again. The processing unit 703 shown in FIG. 7 may be specifically the processor 801. Therefore, specific implementation of the processor 801 is not described again.

An embodiment of this application further provides a communication system. The communication system includes a location management device, a first access network device, and a second access network device. The location management device is configured to perform all or some of the steps performed by the location management device in the embodiment shown in FIG. 4. The first access network device is configured to perform all or some of the steps performed by the first access network device in the embodiment shown in FIG. 4. The second access network device is configured to perform all or some of the steps performed by the second access network device in the embodiment shown in FIG. 4.

An embodiment of this application further provides another communication system. The communication system includes a location management device, a first CU, a first DU, a second CU, and a second DU. The location management device is configured to perform all or some of the steps performed by the location management device in the embodiment shown in FIG. 6. The first CU is configured to perform all or some of the steps performed by the first CU in the embodiment shown in FIG. 6. The first DU is configured to perform all or some of the steps performed by the first DU in the embodiment shown in FIG. 6. The second CU is configured to perform all or some of the steps performed by the second CU in the embodiment shown in FIG. 6. The second DU is configured to perform all or some of the steps performed by the second DU in the embodiment shown in FIG. 6.

An embodiment of this application further provides a computer program product including computer instructions. When the computer program product runs on a computer, the computer is enabled to perform the communication methods in the embodiments shown in FIG. 4 and FIG. 6.

An embodiment of this application further provides a computer-readable storage medium, including computer instructions. When the computer instructions are run on a computer, the computer is enabled to perform the communication methods in the embodiments shown in FIG. 4 and FIG. 6.

An embodiment of this application further provides a chip apparatus, including a processor, configured to invoke a computer program or computer instructions stored in a memory, to enable the processor to perform the communication methods in the embodiments shown in FIG. 4 and FIG. 6.

Optionally, the processor is coupled to the memory through an interface.

Optionally, the chip apparatus further includes the memory, and the memory stores a computer program or computer instructions.

The processor mentioned in any of the foregoing descriptions may be a general central processing unit, a microprocessor, an application-specific integrated circuit (ASIC), or one or more of integrated circuits configured to control program execution of the communication methods in the embodiments shown in FIG. 4 and FIG. 6. The memory mentioned in any one of the foregoing may be a read-only memory (ROM), another type of static storage device that can store static information and instructions, a random access memory (RAM), or the like.

In addition, it should be noted that the apparatus embodiments described above are merely examples. The units described as separate parts may or may not be physically separate, and parts displayed as units may or may not be physical units, may be located in one position, or may be distributed on a plurality of network units. Some or all of the modules may be selected depending on actual requirements to achieve the objectives of the solutions of embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, like a floppy disk, a USB flash drive, a removable hard disk, a ROM, a RAM, a magnetic disk, or an optical disc of a computer, and includes several instructions for instructing a computer device to perform the methods in embodiments of this application.

All or some of the foregoing embodiments may be implemented by using software, hardware, firmware, or any combination thereof. When software is used to implement embodiments, all or some of embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, network device, local computing device, computing device, or data center to another website, computer, network device, local computing device, computing device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, like a network device, a local computing device, or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It should be understood that “one embodiment” or “an embodiment” mentioned in the entire specification means that particular features, structures, or characteristics related to the embodiment are included in at least one embodiment of this application. Therefore, “in one embodiment” or “in an embodiment” that appears throughout the specification does not necessarily mean a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one place, or may be distributed on a plurality of network units. Some or all of the units may be selected depending on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application.

In conclusion, the foregoing descriptions are merely example embodiments of the technical solutions of this application, but are not intended to limit the protection scope of this application. Any modification, equivalent replacement, or improvement made without departing from the principle of this application shall fall within the protection scope of this application.

What is claimed is:

1. A communication method, wherein the method comprises:

sending, by a location management device, time information to a first access network device, wherein the time information indicates a reference time and instructs the first access network device to measure, after the reference time indicated by the time information, an $X^{th}$ sounding reference signal (SRS) sent by a terminal device, and X is an integer greater than or equal to 1;

sending, by the location management device, the time information to a second access network device, wherein the time information indicates the reference time and instructs the second access network device to measure the $X^{th}$ SRS sent by the terminal device after the reference time;

receiving, by the location management device, a first measurement result from the first access network device, wherein the first measurement result has been obtained by measuring the $X^{th}$ SRS based on the time information; and receiving, by the location management device, a second measurement result from the second access network device, wherein the second measurement result has been obtained by measuring the $X^{th}$ SRS based on the time information.

2. The method according to claim 1, wherein the time information comprises a coordinated universal time (UTC), a relative time 1900, a system frame number, or a slot number.

3. The method according to claim 1, wherein the time information further indicates to measure, after the reference time indicated by the time information plus an integer multiple of a measurement periodicity, the $X^{th}$ SRS sent by the terminal device.

4. The method according to claim 1, wherein the time information sent by the location management device to the first access network device is carried in a first measurement request message, and the first measurement result is carried in a first measurement response message; and the time information sent by the location management device to the second access network device is carried in a second measurement request message, and the second measurement result is carried in a second measurement response message.

5. The method according to claim 1, wherein the method further comprises:

determining, by the location management device, a location of the terminal device based on the first measurement result and the second measurement result.

6. A communication method, wherein the method comprises:

receiving, by a first access network device, time information from a location management device, wherein the time information indicates a reference time and instructs the first access network device to measure, after the reference time indicated by the time information, an $X^{th}$ sounding reference signal (SRS) sent by a terminal device, and X is an integer greater than or equal to 1; and sending, by the first access network device, a first measurement result to the location management device, wherein the first measurement result has been obtained by measuring the $X^{th}$ SRS based on the time information.

7. The method according to claim 6, wherein the time information comprises: a coordinated universal time (UTC), a relative time 1900, a system frame number, or a slot number.

8. The method according to claim 6, wherein the time information further indicates to measure, after the reference time indicated by the time information plus an integer multiple of a measurement periodicity, the $X^{th}$ SRS sent by the terminal device.

9. The method according to claim 6, wherein the time information received by the first access network device is carried in a first measurement request message, and the first measurement result is carried in a first measurement response message.

10. The method according to claim 6, wherein the first access network device comprises a first central unit (CU), and after receiving the time information and before sending the first measurement result, the method further comprises:

sending, by the first CU, the time information to a first distributed unit (DU); and receiving, by the first CU, the first measurement result from the first DU.

11. An apparatus comprising:

at least one processor coupled to at least one memory storing instructions and configured to execute the instructions to enable the apparatus to:

send time information to a first access network device, wherein the time information indicates a reference time and instructs the first access network device to measure, after the reference time indicated by the time information, an $X^{th}$ sounding reference signal (SRS) sent by a terminal device, and X is an integer greater than or equal to 1;

send the time information to a second access network device, wherein the time information indicates the reference time and instructs the second access network device to measure the $X^{th}$ SRS sent by the terminal device after the reference time;

receive a first measurement result from the first access network device, wherein the first measurement result is configured to be obtained by measuring an SRS of the terminal device based on the time information; and receive a second measurement result from the second access network device, wherein the second measurement result is configured to be obtained by measuring the SRS of the terminal device based on the time information.

12. The apparatus according to claim 11, wherein the time information comprises: a coordinated universal time (UTC), a relative time 1900, a system frame number, or a slot number.

13. The apparatus according to claim 11, wherein the time information further indicates to measure, after the reference time indicated by the time information plus an integer multiple of a measurement periodicity, the $X^{th}$ SRS sent by the terminal device.

14. The apparatus according to claim 11, wherein the time information sent by the apparatus to the first access network device is carried in a first measurement request message, and the first measurement result is carried in a first measurement response message; and the time information sent by the apparatus to the second access network device is carried in a second measurement request message, and the second measurement result is carried in a second measurement response message.

15. The apparatus according to claim 11, wherein the at least one processor is further configured to execute the instructions to enable the apparatus to determine, by the apparatus, a location of the terminal device based on the first measurement result and the second measurement result.

16. An apparatus comprising:

at least one processor coupled to at least one memory storing instructions and configured to execute the instructions to enable the apparatus to:

receive time information from a location management device, wherein the time information indicates a reference time and instructs the apparatus to measure, after the reference time indicated by the time information, an $X^{th}$ sounding reference signal SRS sent by a terminal device, and X is an integer greater than or equal to 1; and send a first measurement result to the location management device, wherein the first measurement result is configured to be obtained by measuring an SRS of the terminal device based on the time information.

17. The apparatus according to claim 16, wherein the time information comprises: a coordinated universal time (UTC), a relative time 1900, a system frame number, or a slot number.

18. The apparatus according to claim 17, wherein the time information comprises the system frame number and the slot number.

19. The apparatus according to claim 16, wherein the time information further indicates to measure, after the reference time indicated by the time information plus an integer multiple of a measurement periodicity, the $X^{th}$ SRS sent by the terminal device.

20. The apparatus according to claim 16, wherein the time information is carried in a first measurement request message, and the first measurement result is carried in a first measurement response message.

* * * * *